(12) United States Patent
Gingrich et al.

(10) Patent No.: US 11,392,897 B1
(45) Date of Patent: Jul. 19, 2022

(54) INTELLIGENT SYSTEM AND METHOD FOR ASSESSING STRUCTURAL DAMAGE USING AERIAL IMAGERY

(71) Applicant: UIPCO, LLC, San Antonio, TX (US)

(72) Inventors: Jess W. Gingrich, San Antonio, TX (US); Yangqiu Hu, San Antonio, TX (US); David Rogers, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/989,375

(22) Filed: Aug. 10, 2020

(51) Int. Cl.
| | |
|---|---|
| G06Q 10/10 | (2012.01) |
| G06Q 10/00 | (2012.01) |
| G06Q 30/02 | (2012.01) |
| G06Q 50/26 | (2012.01) |
| G06Q 50/16 | (2012.01) |
| G06N 3/08 | (2006.01) |
| G06T 7/00 | (2017.01) |
| G06F 30/13 | (2020.01) |
| G06Q 40/08 | (2012.01) |

(52) U.S. Cl.
CPC ............. *G06Q 10/10* (2013.01); *G06F 30/13* (2020.01); *G06N 3/08* (2013.01); *G06Q 10/20* (2013.01); *G06Q 30/0283* (2013.01); *G06Q 50/16* (2013.01); *G06Q 50/26* (2013.01); *G06T 7/0002* (2013.01); *G06Q 40/08* (2013.01); *G06T 2207/10032* (2013.01); *G06T 2207/20081* (2013.01); *G06T 2207/30184* (2013.01)

(58) Field of Classification Search
USPC ........................................................ 705/305
See application file for complete search history.

(56) References Cited

U.S. PATENT DOCUMENTS

| | | | |
|---|---|---|---|
| 9,886,771 B1 * | 2/2018 | Chen | G06F 3/04845 |
| 10,354,386 B1 * | 7/2019 | Farnsworth | H04N 7/185 |
| 2017/0206648 A1 * | 7/2017 | Marra | G01C 21/20 |

FOREIGN PATENT DOCUMENTS

CN        102663800 A   *   9/2012

OTHER PUBLICATIONS

Sumer, Emre and Mustafa Turker. "Building damage detection from post-earthquake aerial images using watershed segmentation in Golcuk, Turkey." (2004). (Year: 2004).*

* cited by examiner

*Primary Examiner* — Michael Young
(74) *Attorney, Agent, or Firm* — Plumsea Law Group, LLC

(57) ABSTRACT

A system and method for capturing and automated processing aerial images of structures to assess structural damage is disclosed. The system comprises a computing system used to obtain images of selected locations associated with known structures at different points in time before and after a natural disaster. The images are used to automatically create three-dimensional models that are used to detect the specific portions of a structure that may be damaged as well as the spatial extent of that damage. In addition, the imagery can be fed into a damage classifier that automatically classifies the degree of damage and generates accurate estimates of repair costs. The system and method may be deployed to quickly assess damage of structures in a disaster area and provide reports of the damage to homeowners and/or insurers.

20 Claims, 18 Drawing Sheets

INTELLIGENT SYSTEM AND METHOD FOR ASSESSING STRUCTURAL DAMAGE USING AERIAL IMAGERY

TECHNICAL FIELD

The present disclosure generally relates to structural damage assessments, and in particular to a system and method for assessing damage done to structures using aerial imagery, machine learning techniques, and 3D modeling.

BACKGROUND

Following disasters such as floods, hurricanes, fires, and tornadoes, entities that insure properties in the disaster area may need to survey the area in order to assess any damage that has impacted one or more insured properties. For large scale disaster areas, aerial imagery may be used to assess damage. Specifically, an aerial vehicle may fly over the disaster area collecting continuous images that may later be combined into a single orthomosaic image. These images can be used to identify generally whether a structure has been damaged. However, obtaining further information regarding the extent of such damage has remained a time-consuming and resource intensive task, typically requiring a human agent to visit the structure in person to more closely examine the effects of the disaster. Even when such examinations are necessary, local environmental conditions following a disaster can prevent access to the structure for several days or weeks. This process can lead to delays for homeowners and other insured entities in receiving much needed relief or support. The ability to quickly and accurately detect what portions of a structure have been damaged and correctly determining the degree of such damage, without the need for on-site manual inspections or other time-intensive tasks, is highly desirable.

There is a need in the art for a system and method that addresses the shortcomings discussed above.

SUMMARY

In one aspect, a method of improving the accuracy of a damage assessment based on aerial imagery is disclosed. The method includes a first step of obtaining a first set of imagery of a first property captured at a first time, and a second step of automatically creating a first three-dimensional (3D) model of the first property based on the first set of imagery. The method further includes a third step of obtaining a second set of imagery of the first property captured at a second time subsequent to the first time, and a fourth step of automatically creating a second 3D model of the first property based on the second set of imagery. In addition, the method includes a fifth step of automatically comparing the first 3D model and the second 3D model using a machine learning model to detect damage on the first property that has occurred in the interval between the first time and the second time, and a sixth step of generating and presenting a damage report based on the comparison of the first 3D model and the second 3D model.

In another aspect, an alternate method of improving the accuracy of a damage assessment based on aerial imagery is disclosed. The method includes a first step of obtaining a first set of imagery of a first property captured at a first time, and a second step of obtaining a second set of imagery of the first property captured at a second time subsequent to the first time, where a natural disaster has impacted the first property during the interval between the first time and the second time. In addition, the method includes a third step of feeding the first set of imagery and the second set of imagery to a deep learning damage classification model, and a fourth step of determining, via the deep learning classification model, that a first portion of a first structure located on the first property has been damaged, and identifying varying damage magnitude levels associated with the first portion. Finally, the method includes a fifth step of generating and presenting a first heat map that visually represents the damage magnitude levels associated with the first portion.

In another aspect, a system for improving the accuracy of a damage assessment based on aerial imagery includes a processor and machine-readable media including instructions which, when executed by the processor, cause the processor to obtain a first set of imagery of a first property captured at a first time, and to automatically create a first three-dimensional (3D) model of the first property based on the first set of imagery. The instructions further cause the processor to obtain a second set of imagery of the first property captured at a second time subsequent to the first time, and to automatically create a second 3D model of the first property based on the second set of imagery. In addition, the instructions cause the processor to automatically compare the first 3D model and the second 3D model using a machine learning model to detect damage on the first property that has occurred in the interval between the first time and the second time, and to generate and present a damage report based on the comparison of the first 3D model and the second 3D model.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF THE EMBODIMENTS

The embodiments provide a system and method for improving and automating the identification and inspection of buildings or other structures using aerial imagery. Conventionally, aerial images are collected and assembled into a mosaic image, usually by a third party. The mosaic image is then be analyzed to find buildings that may be damaged either immediately following an acute event such as a natural disaster or more gradually over time. Using current methods, a building may be broadly identified as being either "damaged" or "not damaged" based on the images. These conventional methods are further limited to detecting external damage to a building.

In contrast, the proposed system leverages machine learning to precisely identify the locations of buildings within a larger mosaic image, and to accurately determine which portions of the building are damaged. Furthermore, the system can infer damage to internal structures, as well as external structures. The disclosed embodiments can provide critical insights to insurance companies and other parties about specific portions of the building that were damaged and the extent of damage at each portion, allowing for a more accurate estimate of rebuilding costs. The system implements a deep learning model to estimate damages across different portions of the building, as well as a machine learning model to detect potential damage to the sides of the building. In addition, a 3D model of the building constructed using both nadir and oblique aerial images is used to determine the dimensions for various portions of the building. Information from each of these models enables the system to readily pinpoint which portions of a structure have been damaged, including both external and internal components of the structure, as well as the exact dimensions of the damaged regions.

Figure 1A:
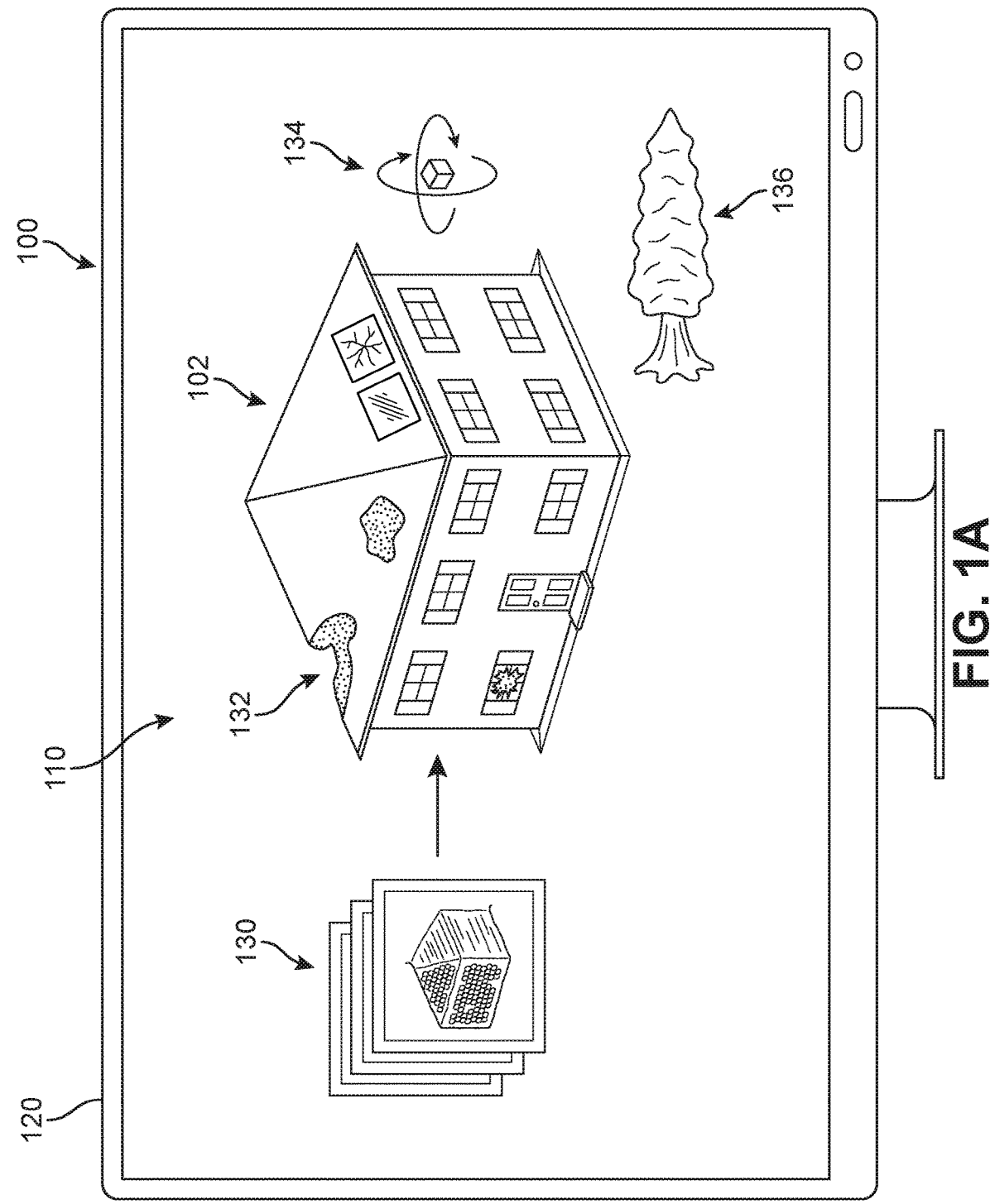
FIG. 1A is a schematic view of a three-dimensional model created by a damage assessment system, according to an embodiment.
Figure 1B:
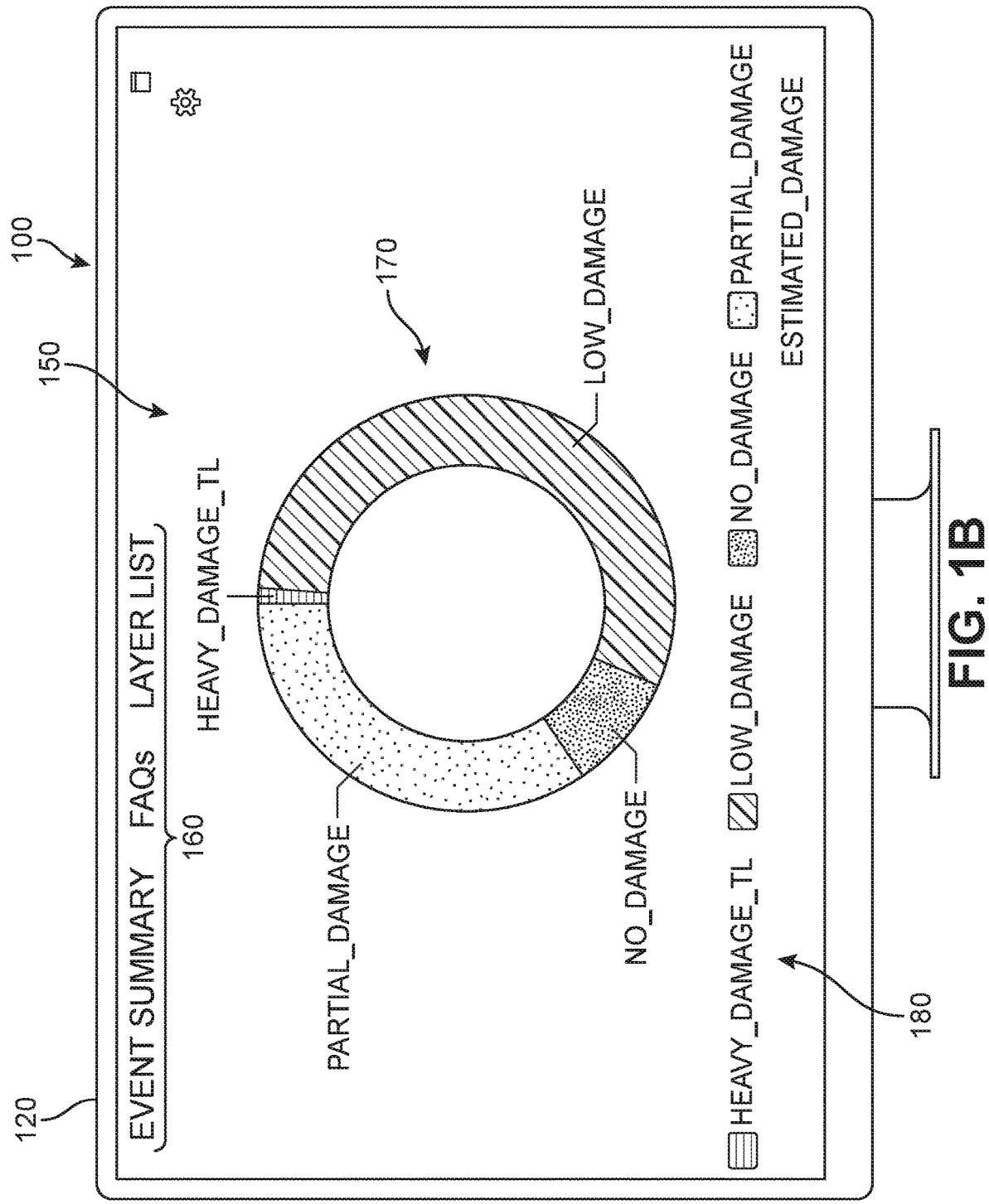
FIG. 1B is a schematic view of a visual dashboard depicting damage-related metrics for a selected region.

For purposes of clarity, an overview of one embodiment of the proposed systems and methods is illustrated with reference to FIGS. 1A and 1B. In FIGS. 1A and 1B, an embodiment of a smart damage assessment system ("system") 100 implemented via a computing device 120 is depicted. In different embodiments, the system 100 is configured to receive aerial imagery-based image data 130 and develop a three-dimensional model 134 of a building, such as of a residence 102. As used herein, the term "building" or "structure" can refer to any kind of building, such as a home, or other residential building, a shed, barn, a commercial building or any other related structures. A building typically can include a roof, room, walls, support structures, windows, or other features.

In some embodiments, the image data 130 can be used to generate different models over time, allowing for a comprehensive and intelligent comparison of the structure between a first point in time (e.g., pre-disaster) and a second point in time (e.g., post-disaster). In other words, imaging data is used to build multiple 3D models of the structure with sufficient precision to detect deviations in the structure over time.

In FIG. 1A, the residence 102 has been exposed to a natural disaster, and as a result was heavily damaged. In this case, the residence 102 can be seen to have suffered structural damage 132 as well as exposure to nearby fallen debris 136. The system 100 may detect the differences in the appearance of the residence 102 and, with reference to output from artificial intelligence-based machine learning models, determine both the specific areas of the residence 102 that have been damaged and the extent of such damage. This assessment encompasses the entirety of the structure of residence 102 by employing highly accurate 3D models of the structure that have been generated based on image data 130 captured over multiple different angles and spatial views and across different periods of time.

In different embodiments, the system 100 can process the information and provide an end-user with a variety of interactive tools to monitor and manage the damage data. As one non-limiting example, FIG. 1B depicts a user dashboard 150 that can be provided to end-users to quickly convey information and observations about a larger group of properties in the region. The dashboard 150 in FIG. 1B presents an analytics overview for the region in which residence 102 of FIG. 1A is located, and includes an interactive header region 160 including a plurality of viewing options (e.g., "Event Summary", "FAQs", "Layer List", etc.) and a metrics summary 170 with a legend 180 which can present a pictorial summary of various aspects of the processed data. In other embodiments, the system 100 can present various metrics and reports for individual structures as well as for larger groups of structures in a region. In some embodiments, some or all of these reports can be presented in graphical form, such as bar graphs, line graphs, pie charts, cartesian graphs, percent complete indicators, etc. In this case, a pie chart represents a specific portion or feature of the structure (e.g., the roof, walls, solar panels, windows, etc.) that has suffered different degrees of damage, and the degree and amount or proportion of damage present in that portion of the structure. For example, a rating of "Heavy Damage", "Partial Damage", "Low Damage", and "No Damage" is used in FIG. 1B. In other embodiments, other scales may be used, including numerical values, color coding, etc. As will be discussed below, system 100 can be used to automatically detect and identify damage within the context of the specific dimensions of the building as well as generate highly accurate estimates of the spatial extent of such damage. This type of data collection, analysis, and visualization can provide essential information to insurers and expedite the processing of claims for insured members.

Referring now to FIGS. 2A-2D, an overview of an embodiment of data flow for implementing the systems and methods disclosed herein is depicted. The data flow represents a process for capturing and processing images of structures covered by policies to improve the speed of assessing structural damage and facilitating claim processing following a disaster. In different embodiments, some of the steps may be performed by ground-based computing system(s) and some of the steps may be performed by aerial system(s).

Figure 2A:
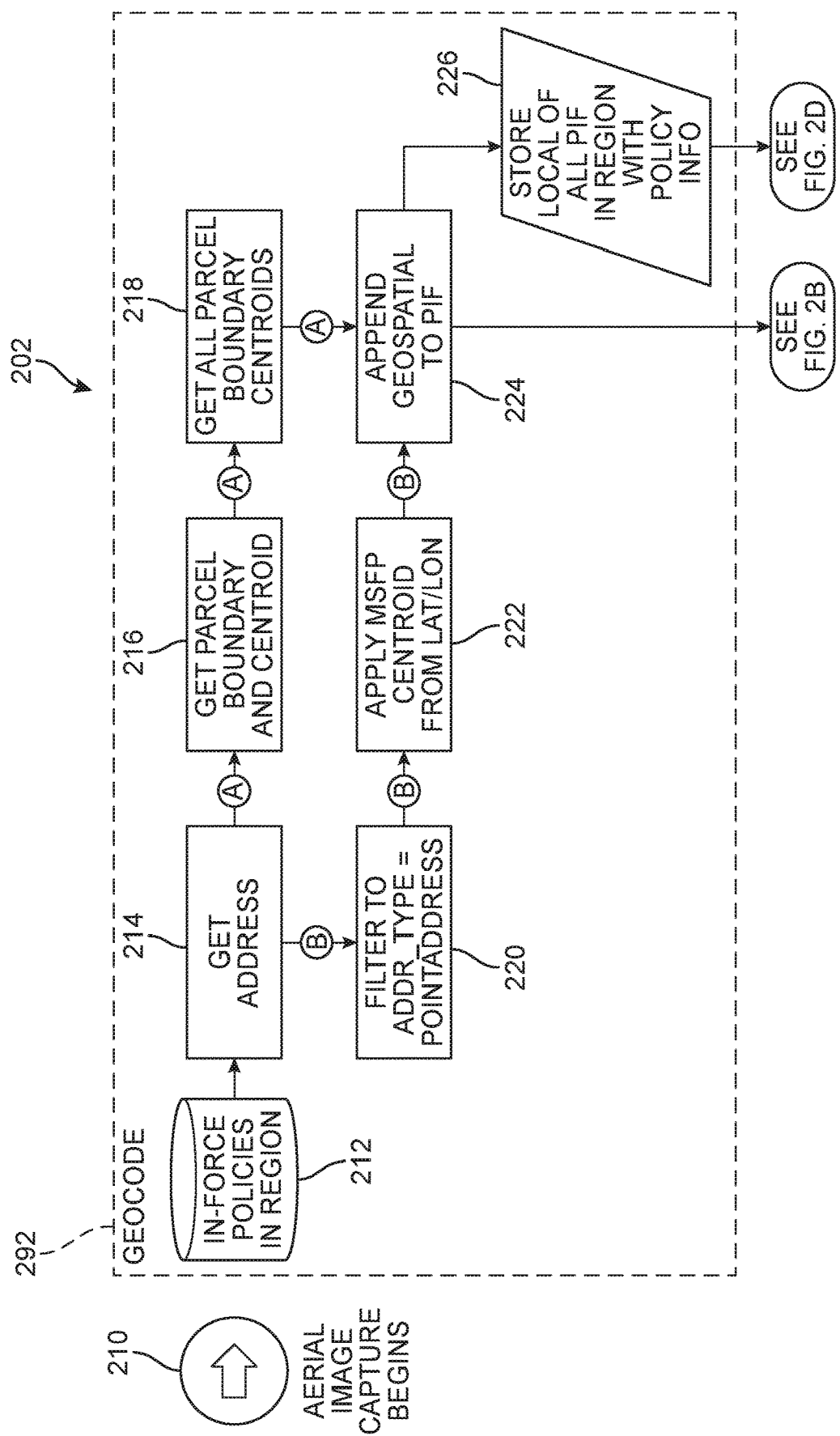
FIGS. 2A-2D are schematic views of a damage assessment flow process, according to an embodiment.
Figure 2B:
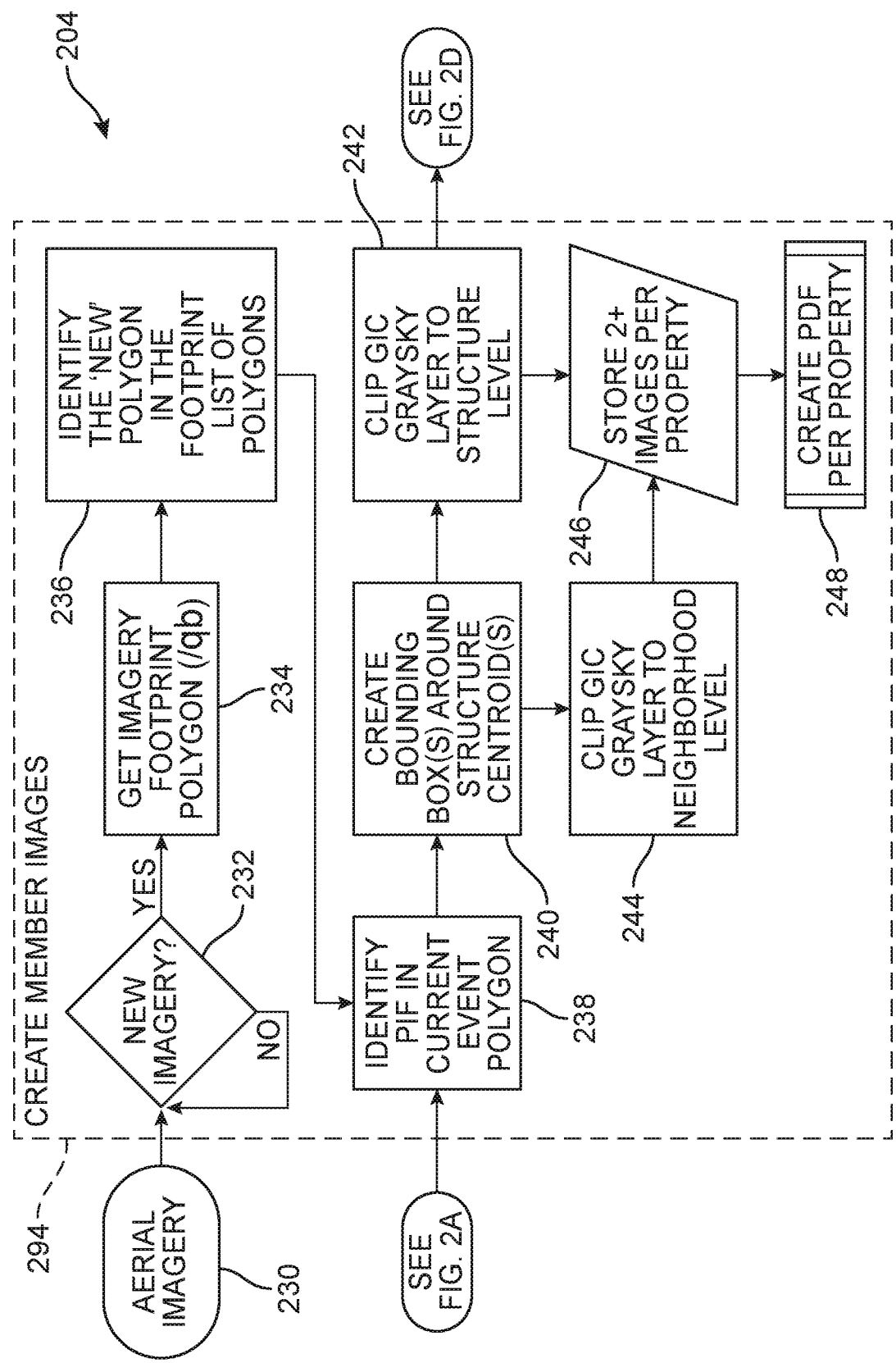
Figure 2C:
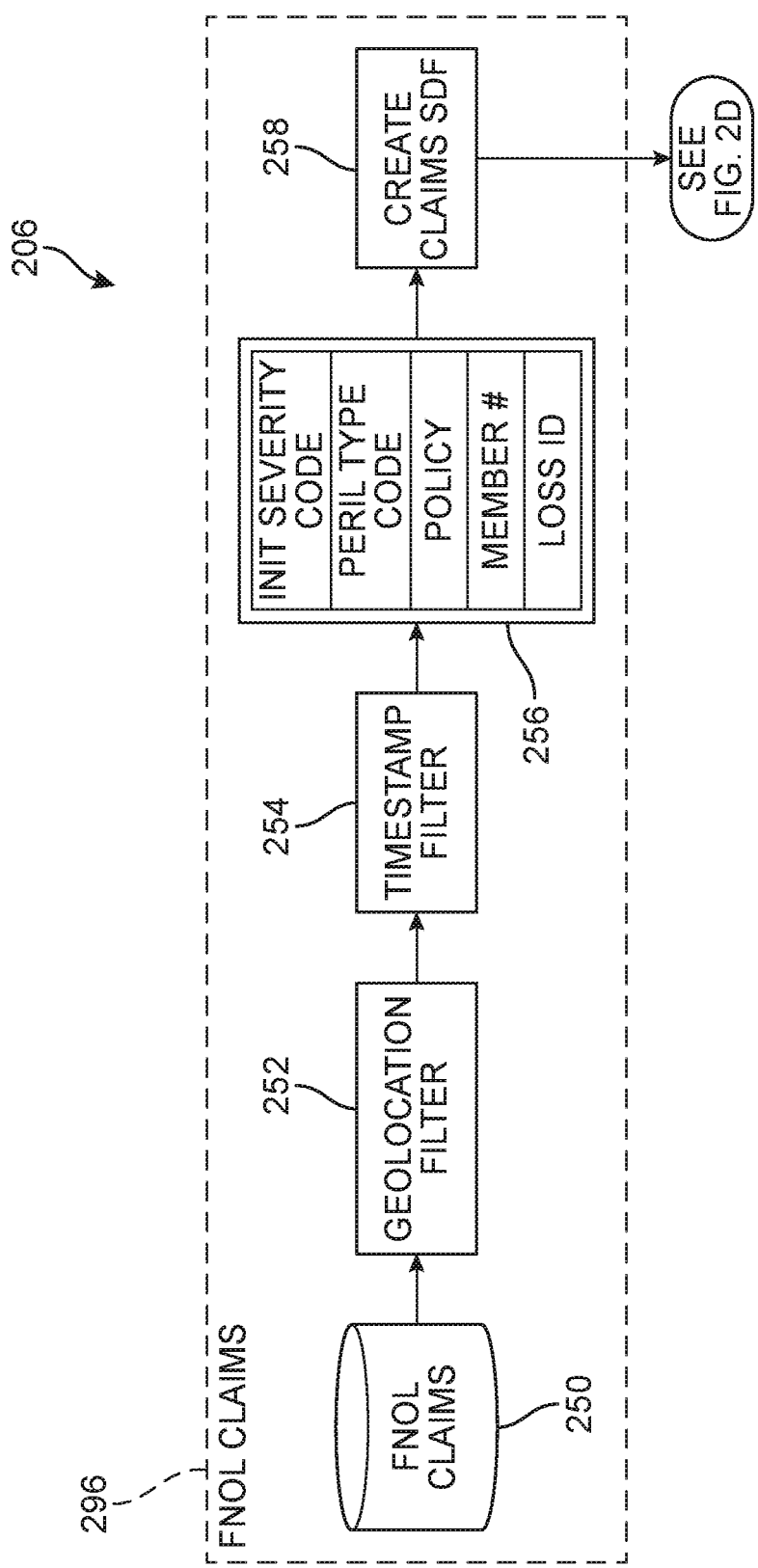
Figure 2D:
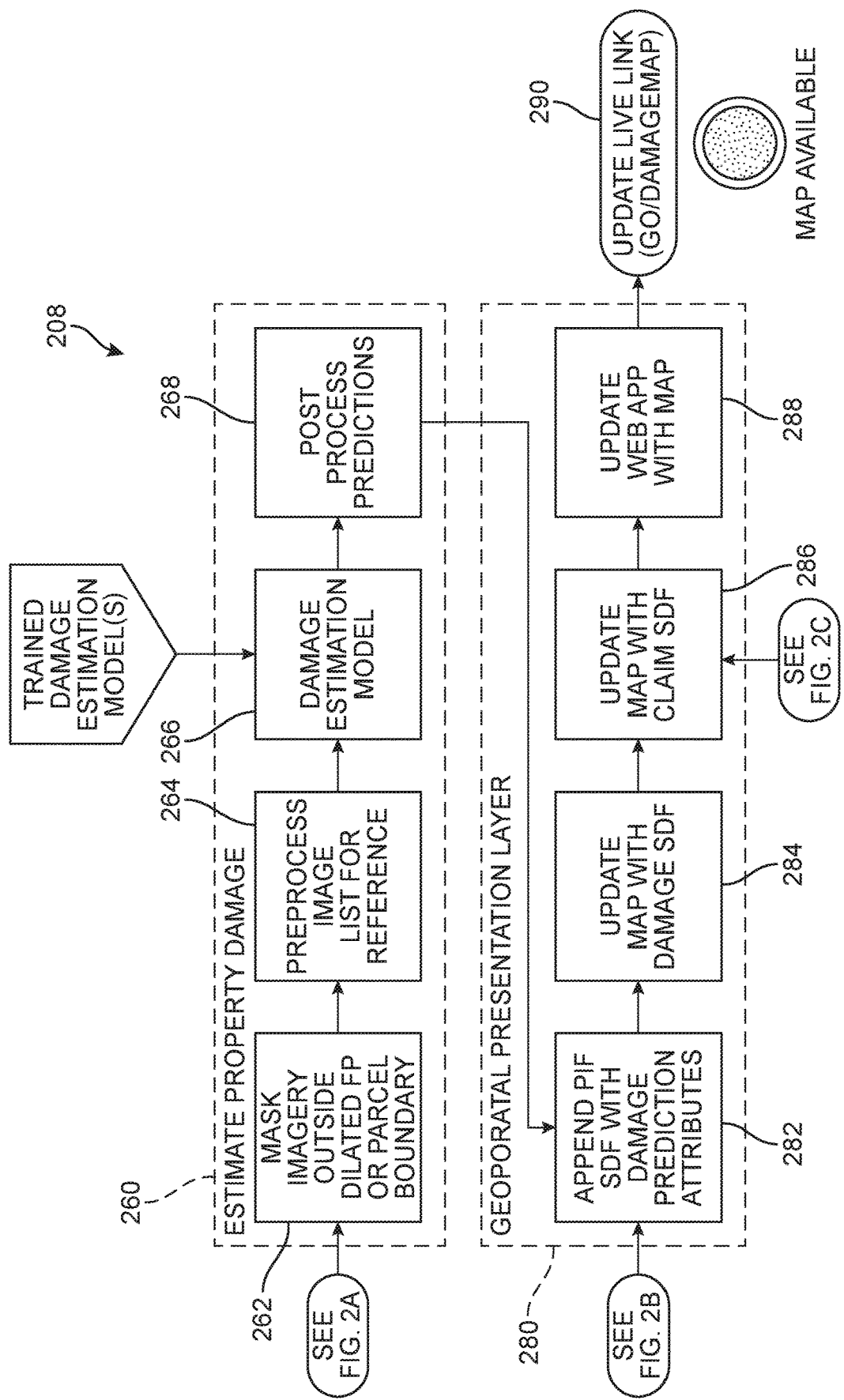

For ease of presentation, the data flow is divided into four interconnected segments, including a first segment 202 (FIG. 2A), a second segment 204 (FIG. 2B), a third segment 206 (FIG. 2C), and a fourth segment 208 (FIG. 2D). The data flow can be understood to begin in FIG. 2A, where an aerial image capture service (AICS) such as Geospatial Intelligence Center (GIC) or other image collection entity initiates an aerial imagery capture session for a target region at an initial step 210. AICSs give insurers and associated damage assessment systems the ability to search an address and view before and after aerials images of properties within the impacted area. Such high-resolution aerial imagery provides insurers with vital information to better serve policyholders, speed up the claims resolution process, and aid in improved fraud detection.

In order to appropriately organize and structure the image data, the image collection is linked or otherwise associated with specific location data during a geocode stage 292. In a first step 212 of the geocode stage 292, the system makes reference to a policy database for the requesting insurer or party to identify and retrieve information about which structures are currently insured ("in-force policies in region" or structures with "policies in force" (PIF)) or structures that are otherwise relevant to the end-user and located within the target region. The address(es) of the relevant PIF structures are obtained in a second step 214. For example, upon learning that a disaster has occurred, an insurance company (or other party) may prepare a list of structures in the disaster area that are insured and thus require damage assessments to be performed.

In some embodiments, the flow can then follow two sub-processes. In the first sub-process, as shown at a third step 216 of FIG. 2A, spatial details for a first structure are obtained, including parcel boundaries and a centroid for the structure. As a general matter, each structure may be associated with location information. As used herein, the term "location information" refers to any kind of information that can be find a geographic location for an object. Location information may include latitude and longitude information. Location information could also comprise a street address. It may be appreciated that location information provided in one format (for example, a street address for a structure) could be converted into another format (for example, a latitude and longitude position). When the location information is specific to a structure (such as a house, office building, or any other structure) the term "structure location" may be used. By obtaining a list of structure locations, the system can capture images of areas that include the structure locations. For example, an airplane may fly over the disaster area and photograph areas according to the provided list of structure locations.

This process is repeated in a fourth step 218 until boundaries and centroids for all relevant structures in the target region have been acquired. This geospatial information is appended in a fifth step 220 to a file or other data structure directed to the designated PIF structure. The first sub-process (labeled as A-path) can in different embodiments apply or be performed by a virtual survey tool such as CoreLogic® or another survey system that can be used to virtually assess property exposure, condition and features, as well as survey post-catastrophe damage based on aerial imagery.

In a second sub-process, as shown at a sixth step 220 of FIG. 2A, the address information is filtered (e.g., "Filter to Addr_Type=PointAddress") for processing and use by the AICS system. In this case, point address refers to a locator code or name created for common addresses that contain a street number and street name. This locator role uses feature classes with polygon or point geometry as the primary reference data. Thus, each feature in the primary reference data corresponds to a single address. However, other filters may be applied to the address information based on the requirements of the AICS system being used. In a seventh step 222, the latitude and longitude of the centroid is determined for each point address, and this geospatial information is appended in the fifth step 220 to a file or other data structure directed to the designated PIF structure. The second sub-process (labeled as B-path) can in different embodiments apply or be supplemented or performed by a set of deep learning generated building footprints covering the target region such as Microsoft® Building Footprints. The footprints can be used for visualization using vector tile format or as a hosted feature layer to do analysis. This group of data for each PIF is stored locally within data files for the target region.

Furthermore, the collected data is conveyed for further processing to a Member Images Creation stage 294 (see FIG. 2B) and a Property Damage Estimator stage 260 (see FIG. 2D). Referring first to FIG. 2B, the captured aerial images 230 are reviewed to determine whether they represent new imagery in an eighth step 232. If the system determines the imagery is not new, no further steps will be taken. If the system determines the imagery is new, imagery footprint polygon for the imagery is obtained or created in a ninth step 234 using the spatial reference of the mosaic dataset, which may be different from the source raster datasets. The imagery footprint polygon refers to the spatial area for a given location search area, or a Well-Known Text (WKT) representation of the shape (footprint, geometry) that defines the location. The process may be performed by a service such as but not limited to QuickBird (QB) or other services providing data sets that contain high-resolution imagery and geospatial data for the target region. With QuickBird, each order is defined by an Order Polygon. An Order Polygon may contain a minimum of four vertices and a maximum of 1,000 vertices, consisting of longitude/latitude (decimal degrees) geographic coordinates on the ellipsoid. The minimum and maximum size for an order polygon depends on the order type and the product selected. In a tenth step 236, the new polygon in the footprint list of polygons is identified.

The new polygon, along with the output of FIG. 2A, are linked to identify the PIF structure(s) located in the current event polygon in an eleventh step 238, and a bounding box is created around each of the centroids for the structures in a twelfth step 240. A first sub-process then clips the imagery layer to the structure level and both shares this data with a geoportal presentation layer stage 280 (see FIG. 2D) in a thirteenth step 242. In a second sub-process, the imagery layer is clipped to the neighborhood level in a fourteenth step 244. In addition, in a fifteenth step 246, the imagery for the structure level and the neighborhood level (at least two images) is stored in association with each property file. Finally, a PDF presenting the processed imagery for the structure is created for each property in a sixteenth step 248, concluding the process segment of FIG. 2B.

Referring next to FIG. 2C, first notice of loss (FNOL) claim(s) are created in a FNOL Claims stage 296. A FNOL refers to the initial report made to an insurance provider following loss, theft, or damage of an insured asset, and is normally the first step in the formal claims process lifecycle.

Thus, an automated process for generating such a report can be of great value to both the insurer and homeowner, as it greatly expedites the process as a whole. In a seventeenth step 250, the system makes reference to an FNOL claims database and applies a geolocation filter (eighteenth step 252) and a timestamp filter (nineteenth step 254) to obtain the appropriate data. In a twentieth step 256, an initial severity code, peril type code, policy number or reference, member number, and/or loss ID are assigned to the report. Finally, the FNOL claim report (e.g., a PDF or other documentation output) is generated in a twenty-first step 258 and sent to the geoportal presentation layer stage 280 of FIG. 2D.

Referring now to FIG. 2D, two additional stages of the data flow process are depicted as fourth segment 208. In the property damage estimator stage 260, output from FIG. 2A is received and imagery outside of the dilated false positives (FPs) or parcel boundary is masked in a twenty-second step 262. False positives (FP) are parcels which were erroneously included by either machine or human experts. The image list is preprocessed for reference in a twenty-third step 264, and with the use of trained damage estimation model(s) (see FIGS. 3A and 3B), a damage estimation model is produced in a twenty-fourth step 266 to generate post-process predictions in a twenty-fifth step 268. This output is provided as input to the geoportal presentation layer stage 280, along with the output from FIG. 2B. In a twenty-sixth step 282, the PIF that is in force as listed at the Special Direct Facility (SDF) is appended with damage prediction attributes from twenty-fifth step 268. Generally, buildings with certain insurance policies can be required to a monitoring agency to supervise the issuance of policies and the claims process for policies in force on the property.

The map is then updated with damage SDF in twenty-seventh step 284 as well as claim SDF (based on output from FIG. 2C) in a twenty-eighth step 286. The web map is updated with the claim and damage map features in a twenty-ninth step 286, and finally the live link to the augmented, comprehensive map and report for each PIF structure is updated and made available to system users in thirtieth step 290.

Figure 3A:
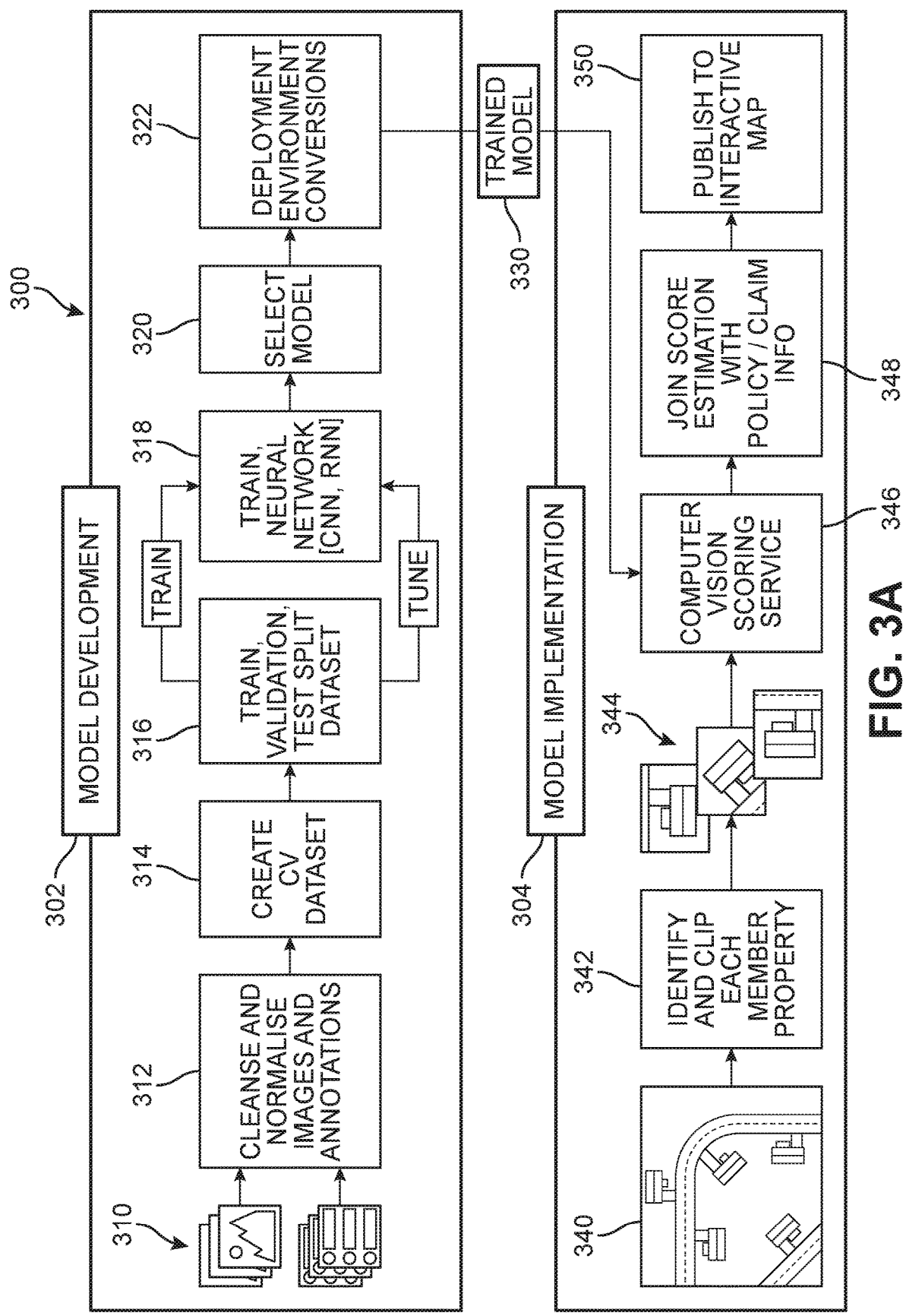
FIGS. 3A and 3B are schematic views of a process for developing and implementing a model, and processing images, according to an embodiment.

In different embodiments, the system can include provisions for generating highly accurate estimates of damage and repair costs. In FIG. 3A, one embodiment of a flow process 300 for development and implementation of a machine learning model for image processing is shown. The flow process 300 includes a first stage 302 (model development) and a second stage 304 (model implementation). During the first stage 302, input 310 in the form of imagery and associated annotations is provided to the system. The input 310 is cleansed and normalized in a first step 312 and a CV dataset is created based on this data in a second step 314. In different embodiments, various image processing algorithms and/or software may be used with captured image data. In one embodiment, the image processing algorithms perform compression, artifact correction, noise reduction, color corrections, geometric corrections, imager non-uniformity correction, etc., and various image processing enhancement operations on the image content. The algorithms can be implemented as software running on a processor, DSP processor, special purpose ASIC and/or FGPA's. The image processing algorithms can also be a mixture of custom developed algorithms and libraries. The image processing algorithms can further be arranged in any logical sequence, with potential changes in the sequence of processing or parameters governing the processing determined by image type, computational requirements or outputs from other algorithms.

In some embodiments, image processing may also include machine learning techniques that can be used to discriminate between features and to identify objects, for example via image recognition and object detection software. Such techniques may also include machine vision algorithms that perform, among other operations, symbol and logo recognition, general shape recognition, as well as object classification. The machine vision algorithms may reside on a different system belonging to a different entity than the image processing algorithms or the application software. The machine vision algorithms, which are applied to identify an object in the digital image, may include computer vision algorithms such as image analysis algorithms that may use a feature detector or a combination of detectors. For example, texture detectors and edge detectors known to those skilled in the art may be used. If both specific texture and specific edges are detected in a set of images, then an identification may be made. One non-limiting example of an edge detection method includes the Canny™ algorithm available in computer vision libraries such as Intel™ OpenCV. Texture detectors may use known algorithms such as texture detection algorithms provided by Matlab™. Some non-limiting examples of object detection algorithms include R-CNN, SPP, Fast R-CNN, Faster R-CNN, Feature Pyramid networks, RetinaNet (Focal loss), Yolo Framework—Yolo1, Yolo2, Yolo3, and SSD.

A cycle comprising a third step 316 in which the model is trained, validated, and a split dataset tested followed by a fourth step 318 in which the selected neural network (e.g., CNN, RNN, etc.) is trained and tuned based on the output of third step 316 then occurs. More specifically, machine learning techniques, such as deep learning that includes classification, clustering, and/or other techniques, are applied to the CV dataset to develop the model(s). Such ML techniques may include, but are not limited to, techniques that employ deep learning neural networks for pattern recognition within the image data, or to perform other types of analysis. For example, a neural network and/or classification technique may be used to train a model that is a classifier and that is useable to detect different types of damage. Some suitable artificial intelligence software is available for public access through open source AI platforms like Caffe, Torch and Theano who provide businesses access to powerful neural networks for processing of their information by AI techniques like deep learning, reinforcement learning and logistic regression, as well as TensorFlow, OpenAI, and BigSur. All of these AI systems process enormous amounts of data; for example, Caffe can process over 60 million images per day with a single NVIDIA K40 GPU.

Moreover, in some implementations, the process may employ an estimation engine that uses ML techniques to generate repair cost estimate information. In some embodiments, such techniques may include supervised and/or unsupervised ML techniques. In some implementations, the estimation engine may employ a ML-based model that is trained using training data that includes prior cost estimates and actual cost information. Accordingly, the estimation engine may be trained over time to develop a more accurate cost estimate based on the previous divergence between estimates and actual cost.

Once a model is selected in a fifth step 320, the trained model is adjusted to fit the intended deployment environment in a sixth step 322, and the resulting trained model 330 is delivered to the model implementation stage 304. In a seventh step 342, large-scale image data 340 for PIF properties are used to identify and clip individual member property imagery 344. Additional details regarding this process is provided below with respect to FIG. 3B. The imagery 344, along with trained model 330, is scored by a computer vision scoring service in an eighth step 348. The obtained estimated score is linked to the member's policy and claim information in a ninth step 348, and then published to the interactive map in a tenth step 350.

Figure 3B:
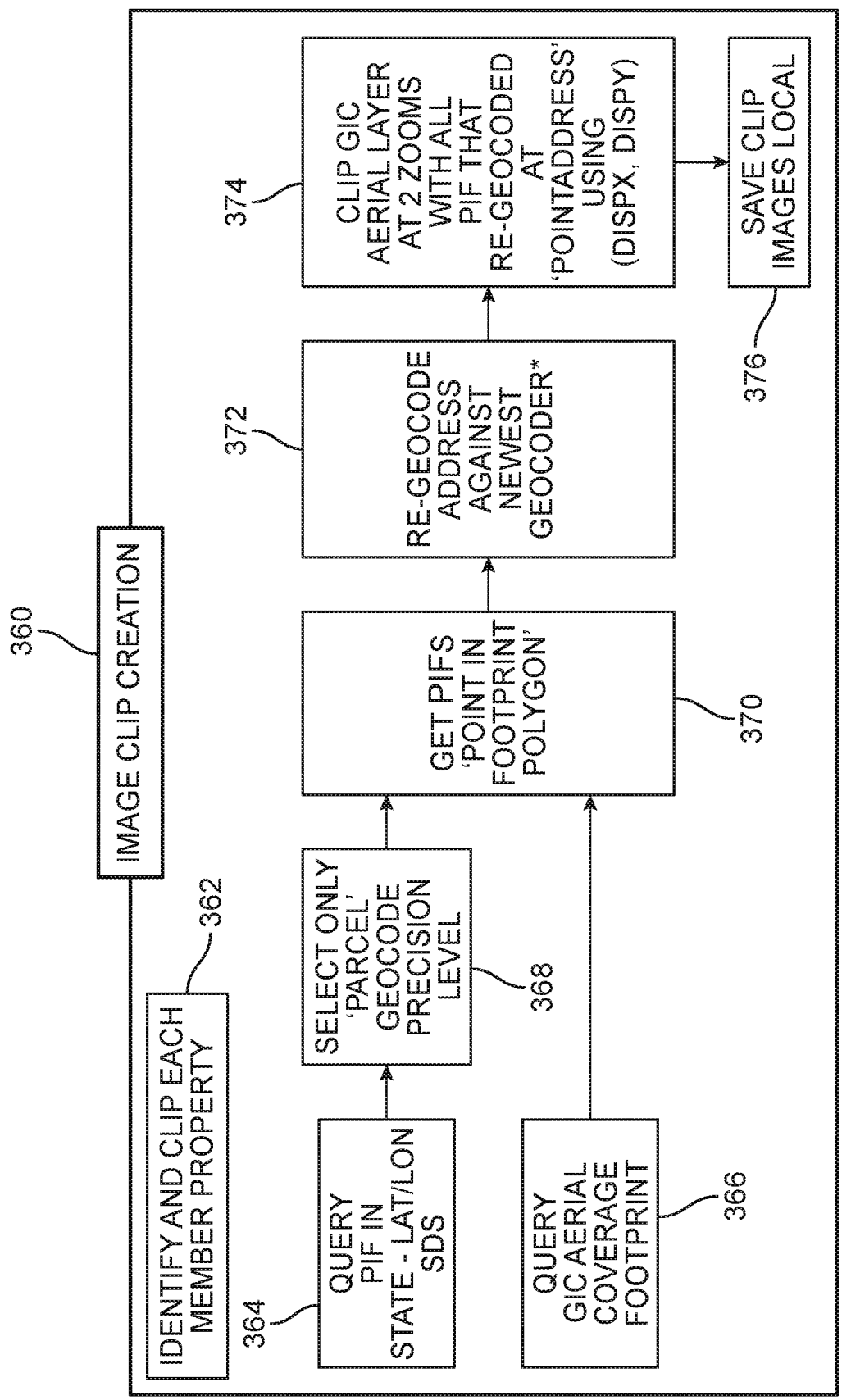

For purposes of clarity, a flow process for image clip creation 360 is depicted in FIG. 3B, where each member property 362 is identified and clipped, as noted in FIG. 3A. In a first step 364, a query is executed for properties with PIF in the selected state or region, or other latitude/longitudinal SDS. In addition, in a second step 366 a query is executed to request an aerial coverage footprint. The query results of first step 364 are filtered to obtain only those member properties with parcel geocode precision levels in a third step 368, and the results from third step 368 and second step 366 are further processed in a fourth step 370 to obtain PIF properties with a point in the footprint polygon, where each point represents a single specific location, such as an address, users location, or asset, and the footprint polygon represents closed and filled shapes such as state or country boundaries, parks or building footprints. They can include both holes and non-overlapping geometries, and are used to calculate boundaries. In a fifth step 372, the address for each property can be re-geocoded based on the newest geocoder obtained, and in a sixth step 374 the aerial layer is clipped at two zooms with PIFs that were re-geocoded at the point address, using for example x and y coordinates, for example by reference to the image server. Finally, the clip images are saved locally in a seventh step 376.

Figure 4A:
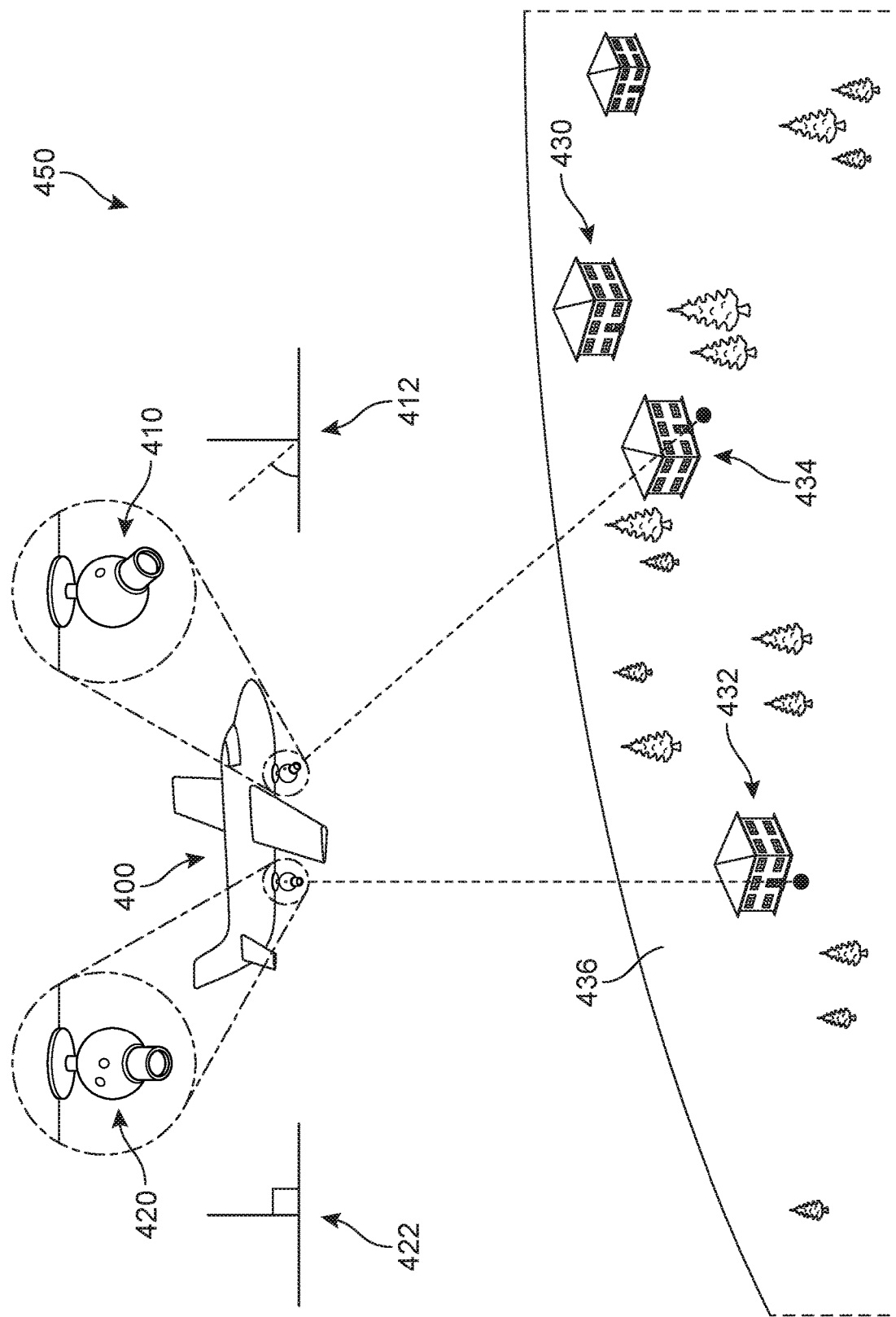
FIGS. 4A and 4B are high-level views of a scenario in which an aerial vehicle collects image data over two periods of time, according to an embodiment.
Figure 4B:
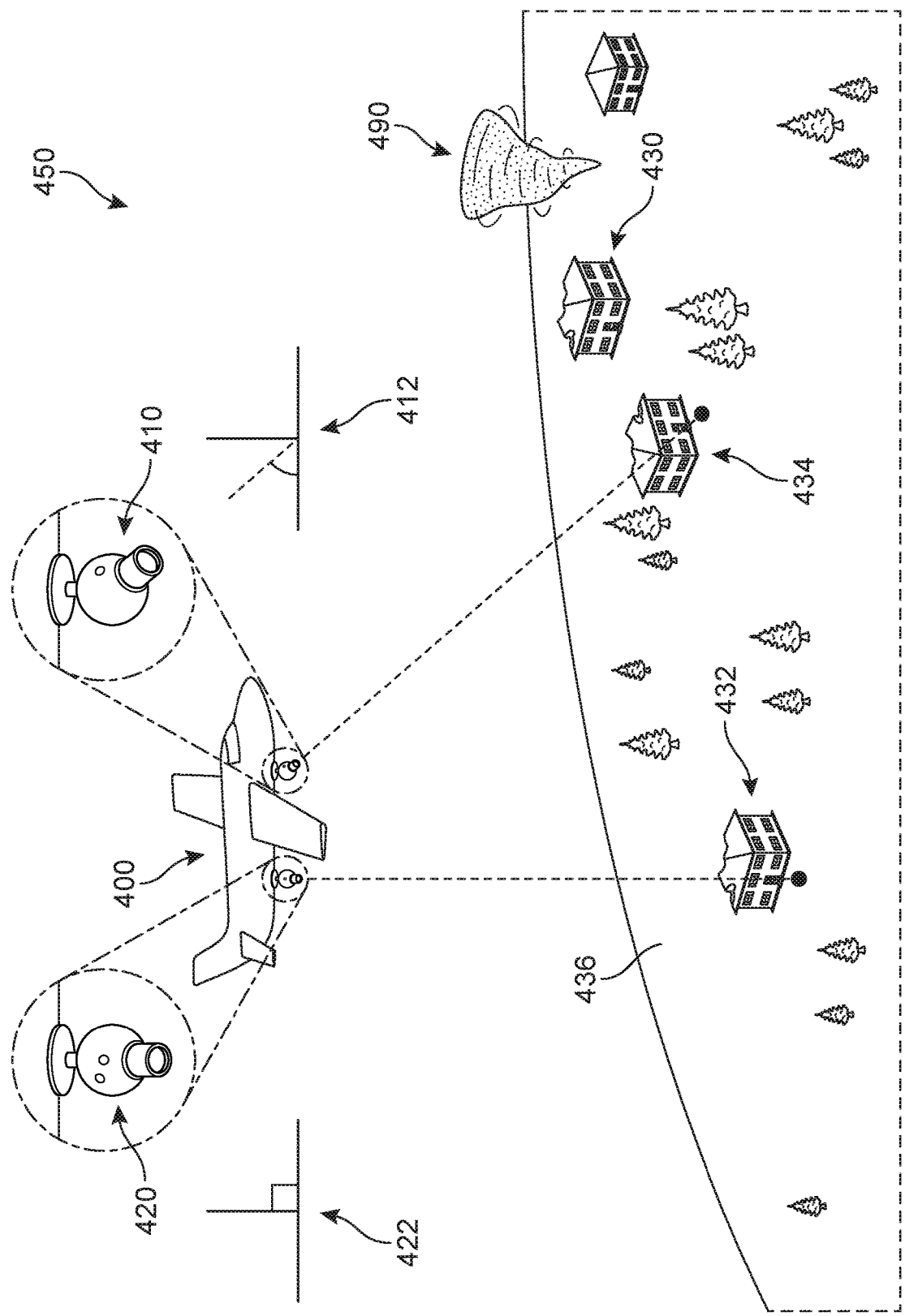

For purposes of illustration, two schematic views of an aerial vehicle 400 performing surveys of a target zone or region 436 are shown in the sequence of FIGS. 4A and 4B. In FIG. 4A, a first survey 450 is performed of a group of structures 430 located in the region 436 at a first time, while the structures are in a "whole" or undamaged state (i.e., prior to the occurrence of a disaster for which the structures may be insured). As used herein, the term "aerial vehicle" refers to any kind of plane, helicopter, drone, or other flying vehicles. In this exemplary embodiment, aerial vehicle 400, also referred to simply as vehicle 400, is a plane operated by a pilot. However, in other embodiments, vehicle 400 could be remotely operated or programmed.

Vehicle 400 includes at least one camera for capturing images. For purposes of simplicity, in FIGS. 4A and 4B the vehicle 400 includes both a first camera 410 and a second camera 420, each oriented differently. However, in other embodiments, the vehicle 400 may employ a single camera that is configured to rotate or reorient its lens to capture images at different angles. It is important that the imagery capture occurs at varying angles in order to collect sufficient image data to generate a 3D model. In some embodiments, the imagery can be obtained using both vertical imagery (nadir, 90 degrees) and oblique (45 degrees) imagery techniques. In general, vertical imagery 422 offers an approximately straight-down aerial view of properties and locations, providing keen insight into rooftops and property surroundings, and at-a-glance situational awareness of large-scale catastrophe scenarios such as city-wide flooding. In contrast, oblique imagery 412 provides an approximately 45° perspective of properties and locations from all four cardinal directions, allowing viewers to see and measure not only the top of objects but the sides as well (e.g., the external walls and windows of a building). In this example, first camera 410 is shown capturing oblique images, and second camera 420 is shown capturing vertical images. The two types of image techniques can be used to collect multiple images of the same structure. In FIG. 4A, the vehicle 400 obtains vertical and oblique imagery for both first house 432 and second house 434 in their pre-damaged or an initial or original state in order to develop a reference 3D model that can be used to monitor and detect changes in the condition of the structure over time.

In different embodiments, vehicle 400 may also include or be in communication with additional systems to facilitate capturing, processing, and transmitting image information about one or more areas. For example, a damage detection system can comprise both a ground system and an aerial system. The ground system includes provisions for gathering information about potentially damaged structures following a disaster that can be used to facilitate an image survey of the disaster area. The ground system may also include provisions for processing image data and for communicating with various other systems. In addition, the aerial system (represented by vehicle 400) includes provisions for capturing aerial images of one or more areas. The aerial system may also include provisions to determine precise locations for captured images, as well as for performing image processing.

Aerial system may comprise various systems and components that are disposed within an aerial vehicle (such as aerial vehicle 400). As noted above, the aerial system may include one or more cameras for capturing images and information about a building structure. The camera may comprise any kind of camera, including any kind of digital camera and/or range imaging camera. Range imaging cameras include any type of device that can capture range information or range images corresponding to an object in the viewing area of the camera. As used herein, "range images" provide a 2D array of values indicating a depth (or distance measurement). Some exemplary range imaging devices may include structured-light 3D scanners and time-of-flight cameras. Using a time-of-flight camera, the system can capture range images of a scene that can be used to build a 3D model of objects in the scene, such as building structures.

The aerial system can also include a GPS receiver for receiving GPS information that can be used to determine a GPS location for the aerial vehicle. In some embodiments, the aerial system may also include sensors for measuring orientation, altitude, and/or acceleration. For example, an aerial system can include a gyroscope, an altimeter, and an accelerometer. In some embodiments, the aerial system can include an altitude and heading reference system (AHRS). Using these devices, the orientation, heading, and height of the aerial vehicle (and of camera(s)) can be determined. This information, when used with a GPS location for the aerial vehicle, can be used to infer the location of one or more points in an image taken from the aerial vehicle as described in further detail below.

In different embodiments, aerial system can also include an image capture and processing system, also referred to simply as processing system. A processing system may be used to store, process, and transmit image information. Additionally, in some cases, a processing system can receive GPS or other coordinate information about one or more target locations. To facilitate these tasks, image capture and processing systems may include one or more processors as well as memory. Memory can store instructions for programs that facilitate storing, processing, and transmitting image information.

Generally, the ground system comprises a computing system that can include, for example, a computer and a database. The computer may further include one or more processors and memory. The computer could be any kind of computer such as a desktop computer, a laptop computer, a server, or any other kind of computer with sufficient computing resources for performing tasks such as image classification. In some embodiments, the ground system can refer to a plurality of interconnected computing devices and/or cloud service repositories configured to connect over a network. Additionally, models or other information could be stored in a separate model database of the computing system.

Furthermore, in some embodiments, computing system may also include a damage classifier. The damage classifier may be any program or algorithm that is used to classify images according to the degree of damage the structure has sustained. In some embodiments, damage classifier includes one or more machine learning models (see FIGS. 3A and 3B). In one embodiment, damage classifier could include a convolutional neural network. In other embodiments, damage classifier could comprise any other algorithm (or set of algorithms) from the field for machine learning and/or machine vision.

The computing system may also incorporate provisions for displaying models of building structures to a user. In some embodiments, the computing system includes an augmented reality (AR) application, which can be used to superimpose a model of a building structure onto a scene captured by a photographic or other camera. In contrast to range imaging camera, photographic cameras comprise sensors for capturing lighting and/or color information that can be used to build a 2D photographic image of a scene. In some embodiments, augmented reality elements could be projected onto a display of a device of the ground system. In other embodiments, a separate AR device, such as AR goggles, could be used to display AR information for a user. The computing system may further include components that facilitate creating and analyzing 3D models of building structures based on ranging image information. In some embodiments, the computing system may further include a model comparison application.

In different embodiments, devices and components of the computing system may communicate over a network. Generally, a network could comprise any kind of network, such as but not limited to a Wide Area Network (WAN), a Local Area Network (LAN), Wi-Fi network, Bluetooth or other Personal Area Network, cellular network, as well as other kinds of networks. It may be appreciated that different devices could communicate using different networks and/or communication protocols. In other embodiments, a 3D modeling application could be configured to run on an end-user device, rather than on a separate system such as a server. In still other embodiments, some components of a 3D modeling system could be run on a user device, while other components could be run on a server.

Both the ground system and aerial system can include communication systems. For example, the ground system can include a first communication system and aerial system can include a second communication system. These communication systems enable information to be transmitted between the ground system and the aerial system via a network. Thus, the type of communication components used in each communication system can be selected according to the type of network used. In some cases, a cellular network could be used so that each communication system includes a cellular radio or other component that enables cellular communication. Using a cellular network may enable information to be exchanged while aerial system is in the air where Wi-Fi or other networks might be unavailable. In other cases, a network could comprise any kind of local area network and/or wide area network. In some cases, the network may be a Wi-Fi network. Alternatively, the ground system and aerial system could be connected by wires, for example, when aerial system is on the ground and near ground system. Furthermore, one or more components of the aerial system could be disposed within a single computing device. Examples of computing devices that could be used include, but are not limited to: laptop computers, tablet computers, smartphones or other computing devices.

Referring now to FIG. 4B, the aerial system of vehicle 400 is depicted performing a second survey 450 of the same group of structures 430 located in the region 436 at a second, subsequent time, shortly after region 436 has experienced a natural disaster (e.g., tornado 490). During the second survey 450, the vehicle 400 again collects vertical and oblique imagery for both first house 432 and second house 434, now in their damaged or altered state. The new imagery will be used to develop an updated 3D model that can be used by the system to detect changes in the condition of the structure resulting from the tornado 490.

Figure 5:
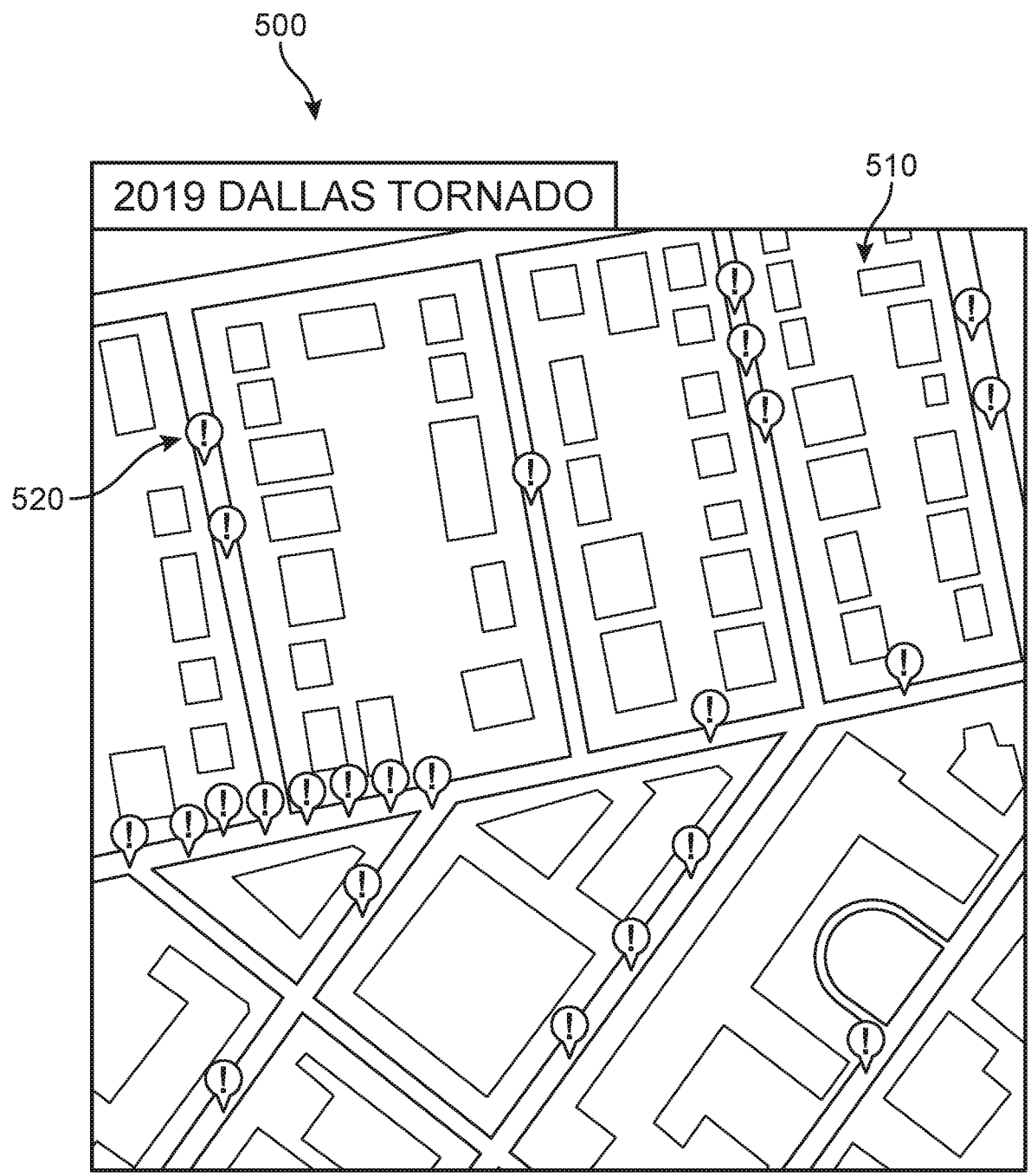
FIG. 5 is a schematic view of a user interface presenting a map with multiple structures identified as being damaged following a natural disaster, according to an embodiment.

This type of collection or survey can be performed across large areas of land to support the automated processing and generation of damage assessments for multiple structures in an affected region. In many cases, homes and other buildings in a city may have insurance policies that cover loss following a disaster such as a tornado. In FIG. 5, for purposes of illustration, a map interface 500 is displayed in which structures located in an area 510 (here shown as Dallas, Tex.) are presented. Based on techniques disclosed herein, the system is able to identify specific buildings 520 that were (a) covered by a particular policy (have a PIF) and (b) have been affected to some degree by the disaster. An end-user can modify or filter the results to generate alternate views. For example, the end-user may wish to only view structures that are classified as residences, or as businesses, or only those structures that were impacted above a selected damage threshold, or have a specific policy type. In some embodiments, the map interface 500 can receive inputs to pan or magnify the view in order to access additional details for one or more structures. In one embodiment, a click or selection of one of the structures can open a new window presenting additional details for that structure and/or trigger the presentation of a new interface in which the end-user can interact with structure-specific data and imagery.

Figure 6:
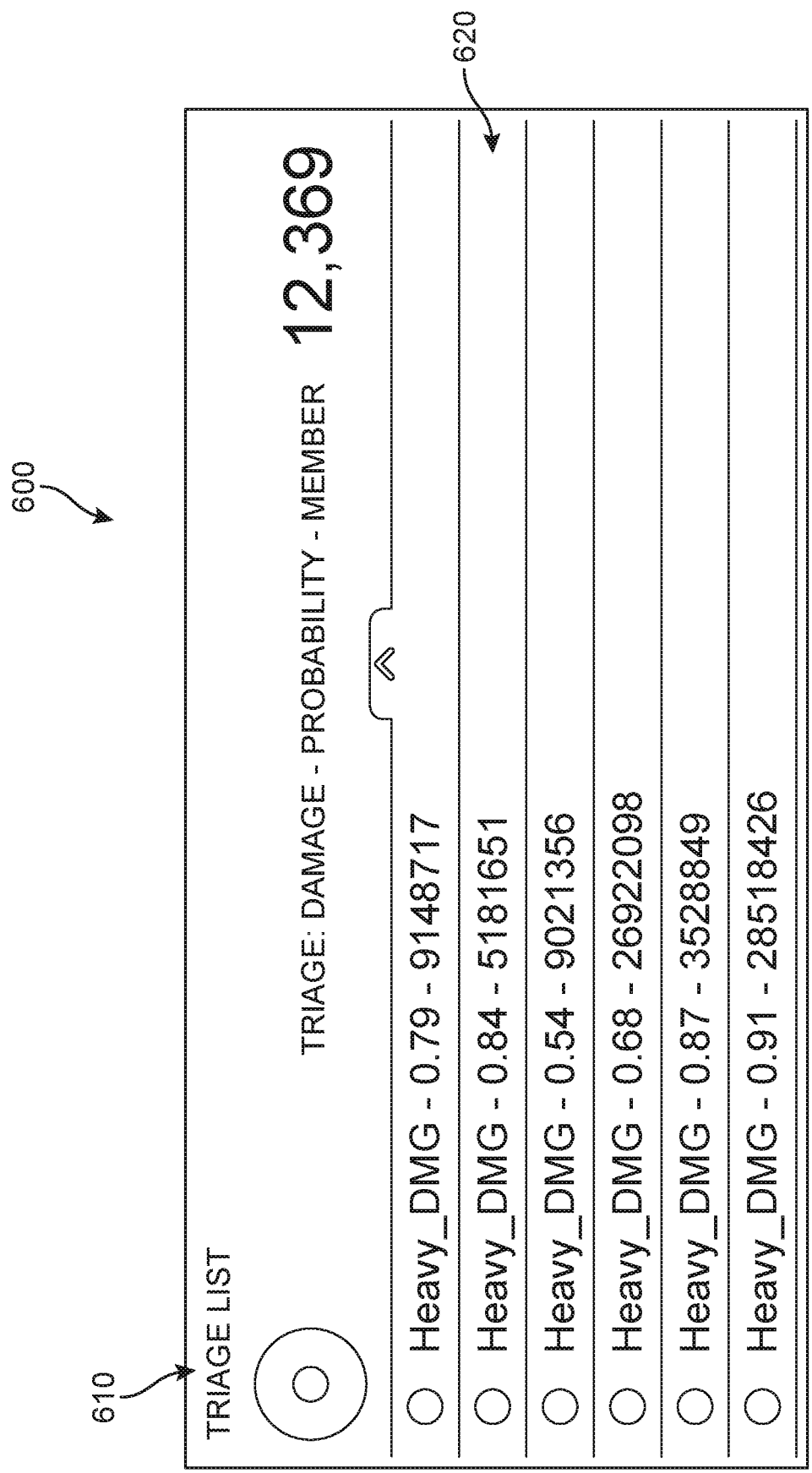
FIG. 6 is an example of a user interface for viewing details of structures identified as being damaged by the damage assessment system, according to an embodiment.
Figure 7A:
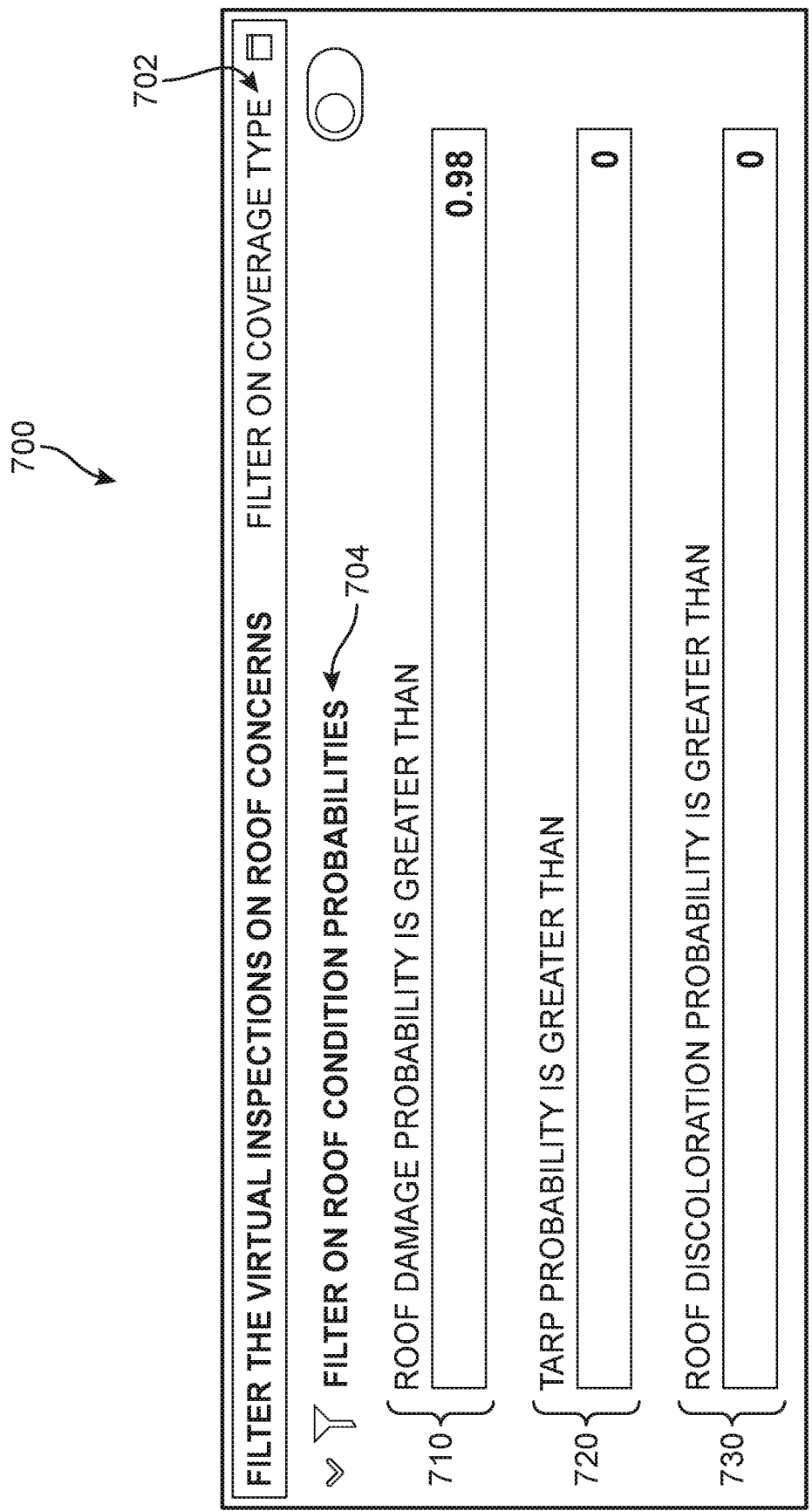
FIGS. 7A and 7B are examples of two user interfaces for applying filters in order to select specific structures identified as being damaged by the damage assessment system, according to an embodiment.
Figure 7B:
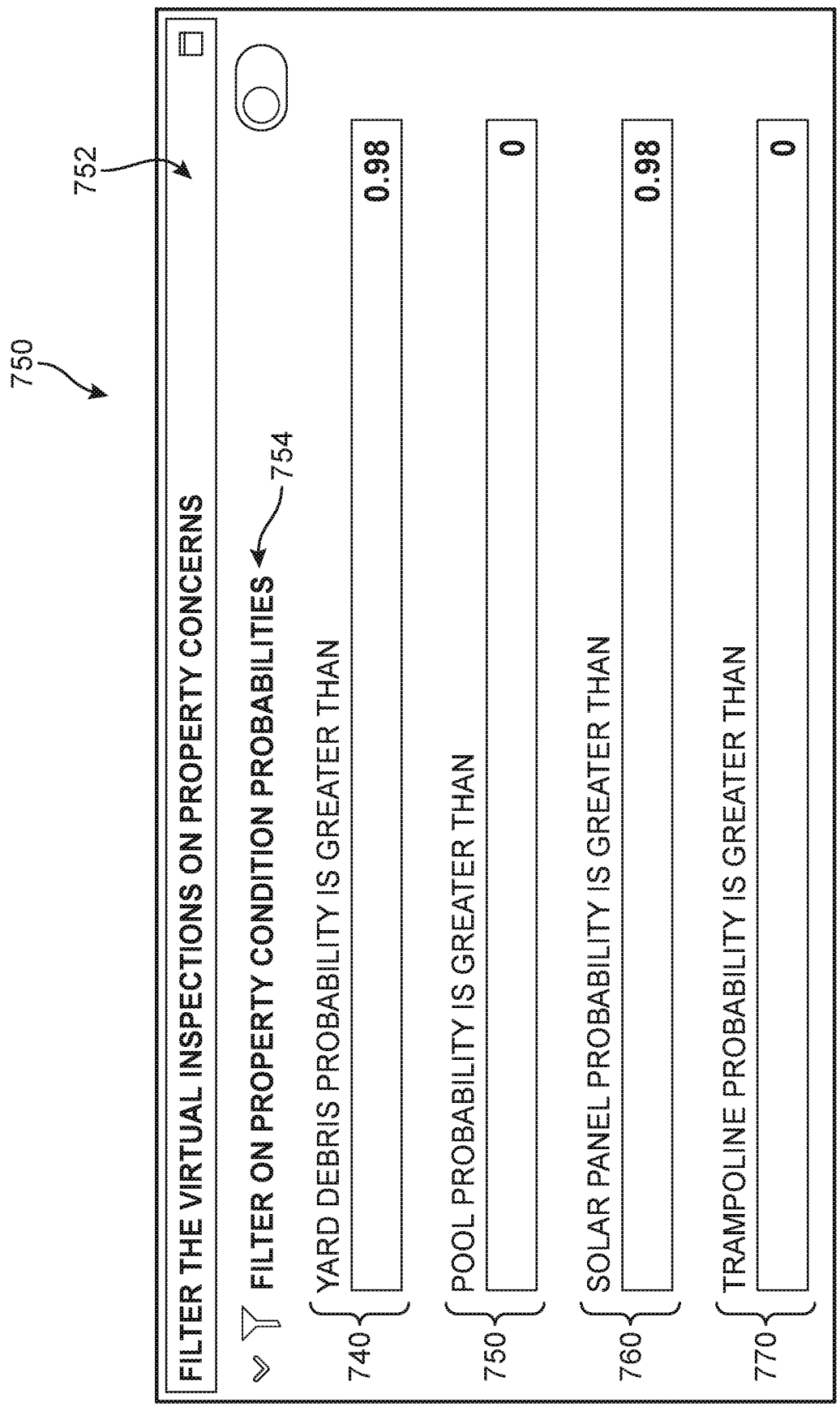

Some non-limiting examples of such information panels and/or filtering options are shown with reference to FIGS. 6-7B. In different embodiments, these interfaces are presented in conjunction with satellite imagery or other depictions of the designated structures or target region. As a general matter, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. Voice control can also be used to actuate options. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

FIG. 6 shows an example of a results panel 600 in which a "triage" list 610 identifying a group of structures that the system has evaluated for damage following a natural disaster. In this case, the system has assessed 12,369 policy holder buildings, and assigned classifications for damage level, the probability of the damage level being accurate, and the member identification number. In FIG. 6, it can be seen that the list 610 includes structures that have been classified as having "Heavy_DMG" with varying probabilities. The selected classification can be applied as a result of damage classification model classifies each structure according to various levels of damage. As an example, the damage classification model could assess structures as having "no damage," "minor damage," "significant damage," or "total loss", or across a more extensive metric, such as an assignment of a number (e.g., between 0 and 10, 0 and 50, 0 and 100, or any other range) in which zero represents no damage and the maximum number represents catastrophic damage. Of course, other classifications are possible. In addition to classifying the structures according to levels of damage, a damage classifier could also classify the amount of damage using other metrics such as the cost of damage, the cost of payout, as well as other possible metrics.

FIGS. 7A and 7B depict examples of filtering options for a front-end search engine. In FIG. 7A, a first filter interface 700 includes a header 702 with selectable filter categories (e.g., Filter the Virtual Inspections on Roof Concerns", "Filter on Coverage Type", etc.) under which an additional submenu is selected ("Filter on Roof Condition Probabilities"). In this case, some roof-related filters are offered, including a first filter option 710 ("Roof Damage Probability is Greater Than _____"), a second filter option 720 ("Tarp Probability is Greater Than _____"), and a third filter 730 ("Roof Discoloration Probability is Greater Than _____"). For purposes of this example, the end-user has selected a high probability (0.98) for roof damage to view those houses with roofs that have been impacted, and a zero probability for tarp damage and roof discoloration to remove structures with damaged tarps and/or roof discoloration from the search entirely (unless the same structure has both roof discoloration and one of the excluded categories).

Similarly, in FIG. 7B, a second filter interface 750 includes a header 752 ("Filter the Virtual Inspections on Property Concerns") under which an additional submenu 754 is selected ("Filter on Property Condition Probabilities"). In this case, some property-related filters are offered, including a fourth filter option 740 ("Yard Debris Probability is Greater Than _____"), a fifth filter option 750 ("Pool Probability is Greater Than _____"), a sixth filter option 760 ("Solar Panel Probability is Greater Than _____"), and a seventh filter option 770 ("Trampoline Probability is Greater Than _____"). For purposes of this example, the end-user has selected a high probability (0.98) for yard debris to view those houses that have incurred damage around their structure, as well as a high probability (0.98) of properties that include a trampoline, while selecting a zero probability for the presence of a pool and/or solar panel to remove such properties from the search entirely (unless the same structure has both roof discoloration and one of the excluded categories).

It should be understood that the dashboard 150 of FIG. 1B and user interfaces or panels of FIGS. 6-7B represent only one possible depiction of interfaces that may be offered to the end-user, and in other embodiments, any variation in presentation style, options, menus, and graphical depictions can be used, including interfaces customized by the end-user to display the desired information. A Settings option can also be displayed to allow the end-user to create or modify the account. In addition, a number of interface layer options may be provided. For example, other options can allow the user to switch to a landing page that presents a brief summary of the user's account or a log of the user's previous activity.

Figure 8A:
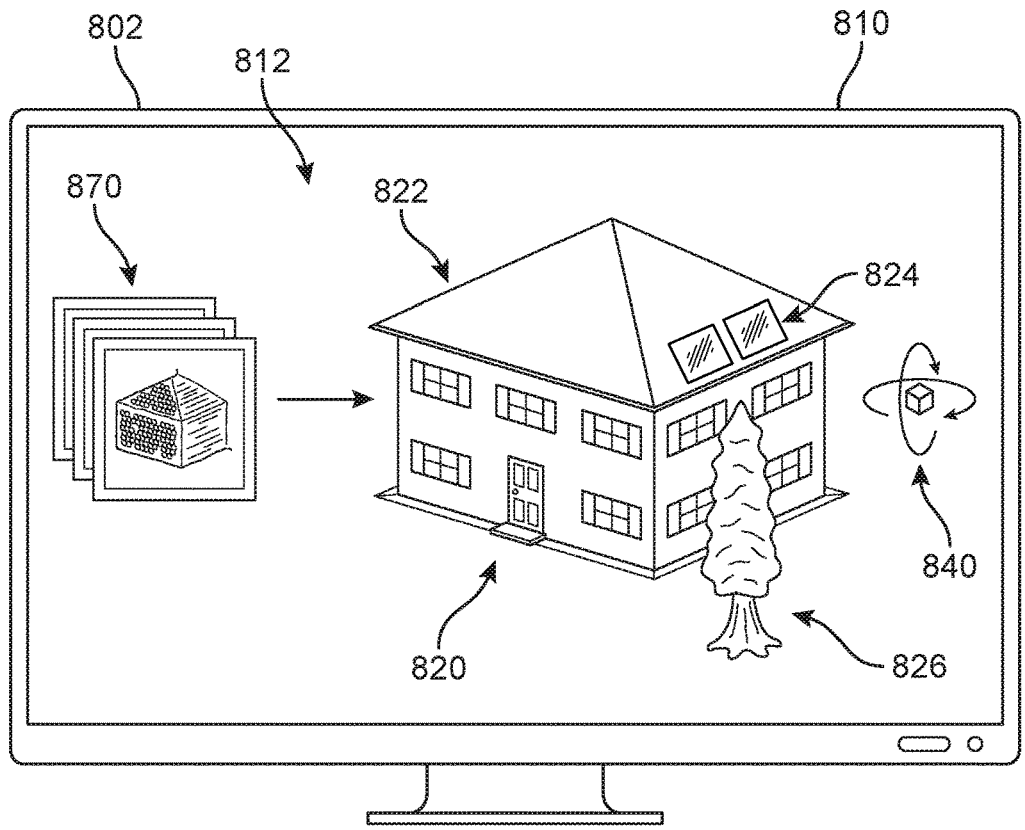
FIGS. 8A and 8B are schematic views of two three-dimensional models created by a damage assessment system based on imagery captured at two different times, according to an embodiment.
Figure 8B:
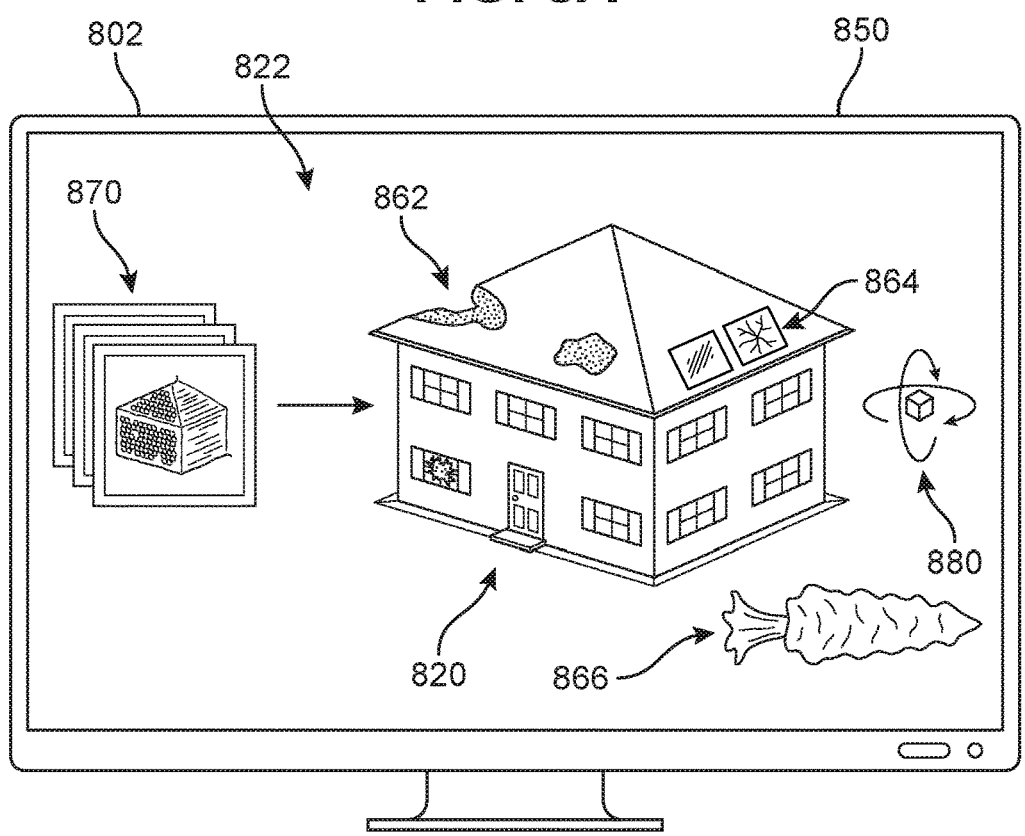

In FIGS. 8A and 8B, an embodiment of a smart damage assessment system ("system") 800 implemented via a computing device 802 is depicted. In different embodiments, as described herein, the system 800 is configured to receive aerial imagery-based image data for structures over different periods of time. In other words, the image data can be used to generate different models over time, allowing for a comprehensive and intelligent comparison of the structure between a first point in time (e.g., pre-disaster) and a second point in time (e.g., post-disaster). In FIG. 8A, first aerial imagery 830 of a building 820 in an initial (pre-disaster) condition 812 is collected and used to develop a first three-dimensional model ("first model") 840 that can be rotated and/or magnified to examine structural details. The building 820 depicted in the first model 840 is a home that includes an undamaged roof 822, operation solar panels 824, and undamaged landscaping 826. The first model 840 is stored in a database in association with the record for the designated property and can be accessed by an end-user to easily review and/or verify characteristics and attributes of the property.

In FIG. 8B, following a natural disaster, second aerial imagery 820 for the building 820 in a damaged state 822 has been collected and used to develop a first three-dimensional model ("second model") 880 that can be rotated and/or magnified to examine structural details. In other words, imagery obtained at a later time can be used to build a new (or updated) model of the building structure which is also stored in memory. In this example, the building 820 depicted in second model 880 can be seen to have suffered extensive structural damage since the first aerial imagery 830 was taken, here including a damaged roof 862, broken solar panels 864, and yard debris 866, where a yard refers to an area of land immediately adjacent to the building or a group of buildings, and may be either enclosed or open.

In some embodiments, the proposed system can be configured to automatically compare the initial or a previous 3D model and the new 3D model. In such cases, a computing system may include software that automatically compares new 3D models of a building structure with previous 3D models of the same building structure. The system could perform predetermined comparisons to check for deviations in different portions of the models. In one embodiment, a model comparison application may be used to analyze the differences between two 3D models. For example, the model comparison application could compare the dimensions of particular structural parts (such as walls, support columns, doors, windows, etc.) and look for possible deviations. Also, the model comparison application could compare the relative orientations of structural parts, including, for example, the angles between walls and floors, walls and ceilings, and/or between parts of a building and a ground surface. In other cases, the 3D models could be viewed by a user and manually compared.

Figure 9:
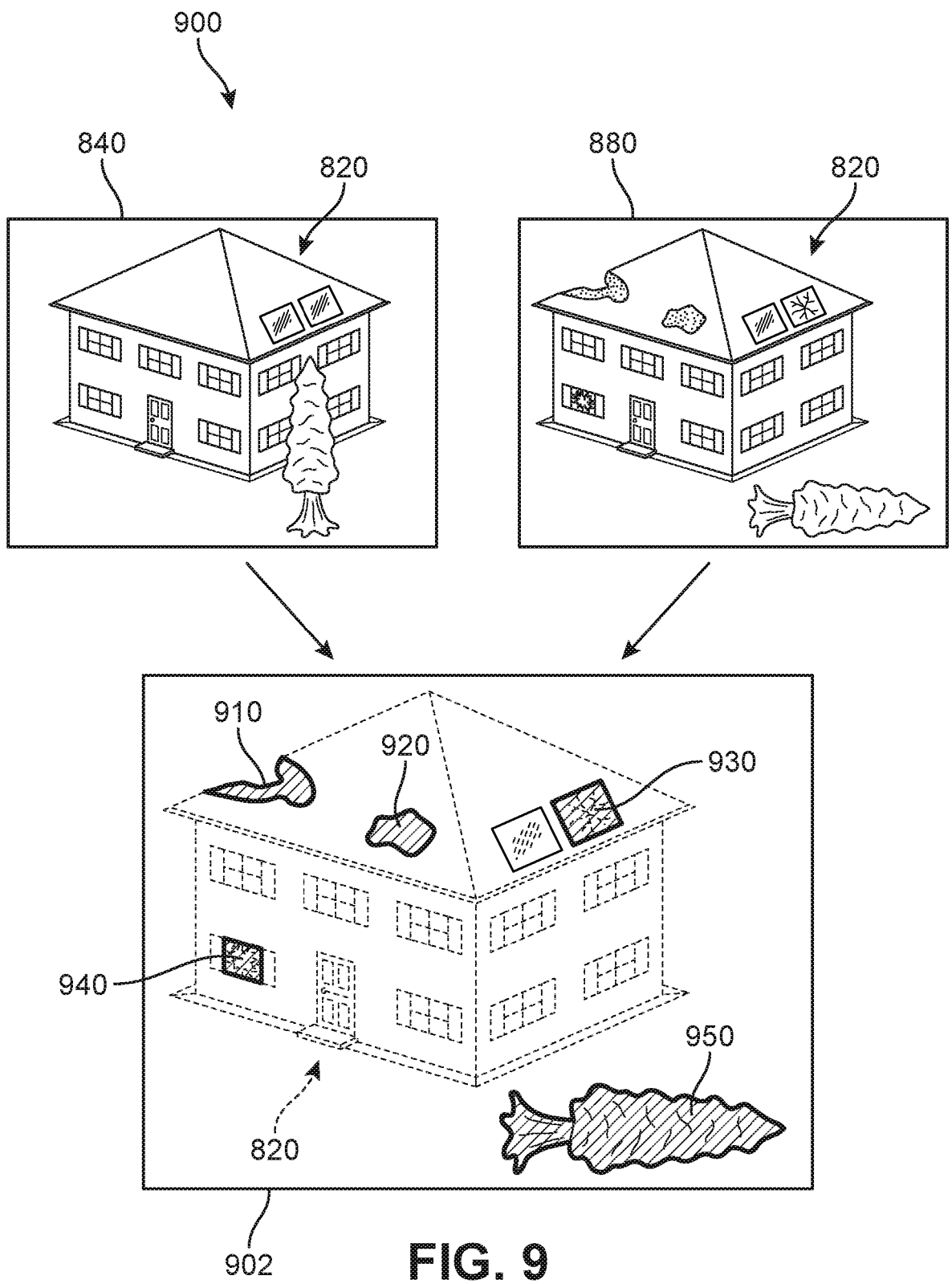
FIG. 9 is a schematic view of the damage assessment system automatically detecting damaged portions in a structure based on the two models of FIGS. 8A and 8B, according to an embodiment.

For purposes of illustration, FIG. 9 depicts a situation in which two 3D models are visually compared using a computing system. Specifically, the initial model 840 of the building 820 is compared to the second model 880 of the same building 820. In this case, second model 880 corresponds to a state of the building structure at a later time. Thus, the two models of the building 820 can be compared with one another to generate highly accurate observations of the changes that have occurred during the period of time between the initial image capture and the subsequent image capture. By reference to the two models, the system can be configured to automatically detect the differences in the appearance of the building 820 before and after the occurrence of the natural disaster and determine the specific areas of the building that have been damaged, as well as the extent of such damage. This assessment encompasses the entirety of the building by relying on a series of comprehensive imagery sets captured over multiple different angles and spatial views and across different periods of time. It should be understood that while the figures present two image capture sessions, in other embodiments, image capture sessions can occur at frequent intervals to allow for the comparison of the damaged structure with the most up-to-date model preceding the disaster.

In FIG. 9, the two model inputs comprising first model 840 and second model 880 are received by the system. A machine learning model, in conjunction with modeling software, is configured to determine the differences between the two models, as well as distinguish between normal changes to the property (e.g., additional trees and/or landscaping, or the intentional removal of trees, updates in house color, roof type, new structural additions, etc.) and changes resulting from the natural disaster. In some embodiments, the detected deviations may be made precise using the modeling software which is able to calculate substantially precise dimensions for parts of a structure, and also determine angular measurements between different parts of surfaces. For example, a wall of a house may be normally disposed an angle of approximately 89 degrees with the ground surface. In contrast, following a disaster, the same sidewall may make an angle of approximately 81 degrees with the ground surface, indicating that the foundation on one side of the building may be sinking or otherwise stressed/compressed. Thus, It may be appreciated that the present system may be useful for detecting slight deviations that are not noticeable upon quick visual inspection and/or that are not perceptible from photographic images. In these cases, the utility of a system that can generate models of a building structure with sufficiently high precision can be clearly seen. Similarly, other components of interest, such as a tarp or debris, may be based on the use of a trained material detection engine. The trained material detection engine may be trained to determine characteristics of an asphalt shingle roof when it has full sun exposure, when it is in the shade, there is a cloud, or if there is damage to the roof, etc.

In this case, the system automatically identifies a first loss 910 and a second loss 920 associated with portions of the roof, as well as a third loss 930 associated with a solar panel. Furthermore, a broken window has been identified as a fourth loss 940, and a fallen tree as a fifth loss 950. Additional damage may have occurred on the opposite side of the house and/or property, but for purposes of simplicity, only the front of the house is illustrated. For each loss identified, the system is configured to further determine the extent of the damage, as well as generate a repair estimate. Thus, the 3D models can be used to retrieve the exact dimensions for various portions of the building, providing such estimates with a high degree of accuracy. Furthermore, in some embodiments, the system may apply visually indicators to the areas where deviation (or damage) may have occurred or otherwise highlighting the location(s) of deviations that are suggestive of possible damage. Visual indicators may alert a user that further inspection of this part of the building structure is needed. In some cases, this information could be further used to make more accurate predictions about the value of a home for insurance or resale purposes.

Figure 10:
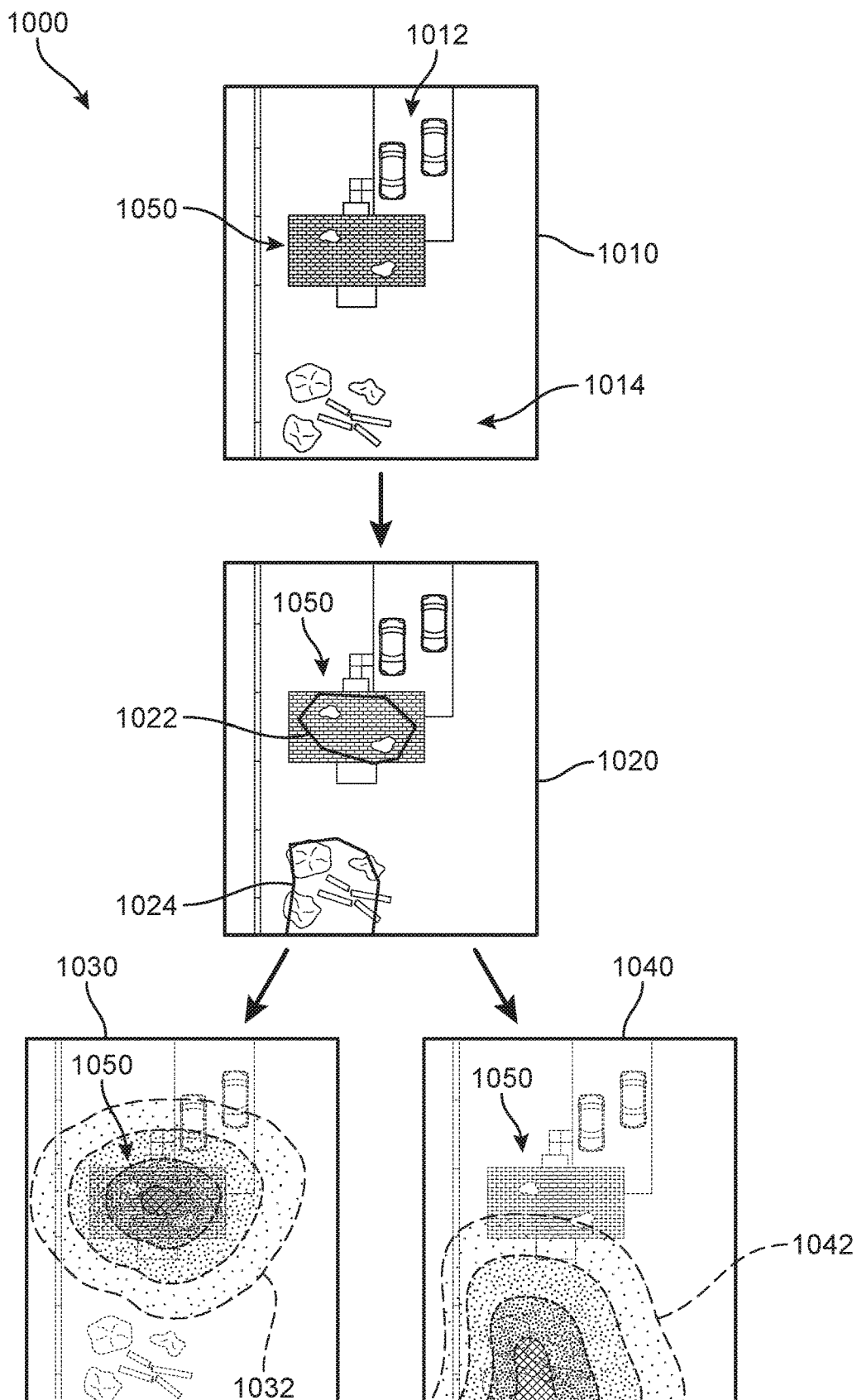
FIG. 10 is a schematic view of a process of employing a deep learning model to generate heat maps representing varying magnitudes of damage to a property, according to an embodiment.

Furthermore, in some embodiments, a deep learning model can be used to estimate damages across different portions of the building. The inputs to this model are vertical (nadir) images and the outputs are a 2D "heat map" of probable damage at different portions of the building. As an example, an overview 1000 of one embodiment of the deep learning model is illustrated with reference to FIG. 10. In FIG. 10, the deep learning model is being applied to a building (here, a residence 102) is shown. A top-down view of a PIF property is presented in a first stage 1010, including a home 1050, a driveway with vehicles 1012, and a yard 1014. The property has experienced a natural disaster and as a result was heavily damaged.

In other words, in different embodiments, aerial imagery may be analyzed to determine if structure has sustained structural or roof damage. For example, image data may be analyzed to determine if a roof at a certain coordinate has all of its corners and edges and whether said corners and edges of said roof appear to be damaged. In another example, image data is analyzed to determine the extent of damage that has occurred (e.g., the percentage of damage to a component (e.g., roof) of structure, as well as identify which portion of the structure is damaged (e.g., roof, walls, windows, porch, or personal property).

In a second stage 1020, the top-down or vertical imagery is input to the deep learning model in order to generate bounded regions in which the detected damage is located. In this case, a first damaged region 1022 associated with the roof has been bounded, and a second damaged region 1024 associated with debris in the yard has also been bounded. The high-resolution imagery is then further processed to determine centroids for the damage and the probable extent of the damage as it radiates outward from the centroid. For example, a heat map or other a data visualization technique may be generated that shows magnitude of damage assessed as color in two dimensions. The variation in color may be by hue or intensity, giving obvious visual cues to the reader about how the damage is clustered or varies over space. Such representations offer end-users a mechanism by which to visualize complex data and understand it at a glance. In this example, a third stage 1030 and a fourth stage 1040 depict a series of enclosed boundaries around each damaged region that serve as a visual indicator for the degree of damage. In other words, the system assigns different damage values or ranking and presents this information in an easily consumable format similar to infrared or heat maps, where the hue or intensity is more pronounced toward the portion of the structure where the damage was greatest. In this case, a first map 1032 and a second map 1042, each representing rich, complex data, have been generated and overlaid on the damaged regions. In another example, the pixel information from an image may be used to create a damage intensity plane that depicts an indication of intensity of damage across a selected area.

The heat map may make use of image processing techniques to help determine the extent of damage, such as filtering, edge detection (e.g., Sobel operator, Prewitt operator, etc.), image hue, saturation, intensity, color, etc. thresholding, or binary image morphology. Image processing techniques to help determine damage include information associated with trained machine learning engines, image classification algorithms, multi class classification, and anomaly detection. In some embodiments, these techniques may be used to correlate particular types and levels of damage or material properties when a threshold is reached. Filtering and transform operators may enhance the image features indicative of damage. Thresholds applied to enhanced pixel values may help to classify regions of damage for detection both spatially within the image and in terms of magnitude relative between regions within an image and relative between images. This may be a learned process where determined thresholds are a function of information such as anticipated damage type, lighting, time of day the picture was taken, or the sensor that recorded the images. In different embodiments, learning (or training) may be implemented by common machine learning algorithms, such as tensor flow, support vector machine, neural networks, autoencoders, Gaussian mixture models, or Naïve Bayes models, among others.

In different embodiments, insurance or other damage-related claims may be proactively created based on the three-dimensional representation. In another example, the aerial vehicle may analyze data about a property (e.g., an image) to determine that additional data may be required and generate a request that further data be collected. In another example, the system may identify a problem associated with the structure and generate a message to alert insurers and/or homeowners about the problem. For example, the system may identify that gas is leaking (e.g., via visual detection of a problem with a pipe, via detecting the gas in the air), and generate an alert to the end-user to shut off the gas. Similarly, such an approach may also be applied to leaking water or any other problem that is detected to mitigate the possibility of additional damage being caused before other repairs can be initiated. In another example, the system may initiate a remedial action, such as initiating an insurance claim to address the damage to the property. Such a claim may be initiated by contacting the insurance provider. In another example, the system may be configured to initiate and adjust an insurance claim at area without seeking prior authorization.

It is further contemplated herein that the analysis may include converting image data into a textual representation of at least some of that data, detecting whether power lines are active (e.g., via thermal imaging, via magnetic field detection), detecting whether a gas line is broken (e.g., via thermal imaging to detect a leaking gas of a different temperature than the background, via analysis of the gas(es) in the air), or the like. Such analyses may be utilized to predict (and send appropriate warnings) regarding possible future damages or accidents that may be caused by one or more of these conditions. In another example, hyperspectral imagery is taken, utilized, and analyzed to determine information such as what kind of damage was sustained, to determine for example whether water damage was caused by salt water or fresh water. The type of water damage may be utilized to determine if an insurance claim should be characterized as flood or storm damage or the extent of damage, such as damage to carpet, wood flooring, or the like. In another example, the aerial vehicle may gather thermal imagery, which may be utilized to identify hail (or other) damage to a home's roof.

Figure 11:
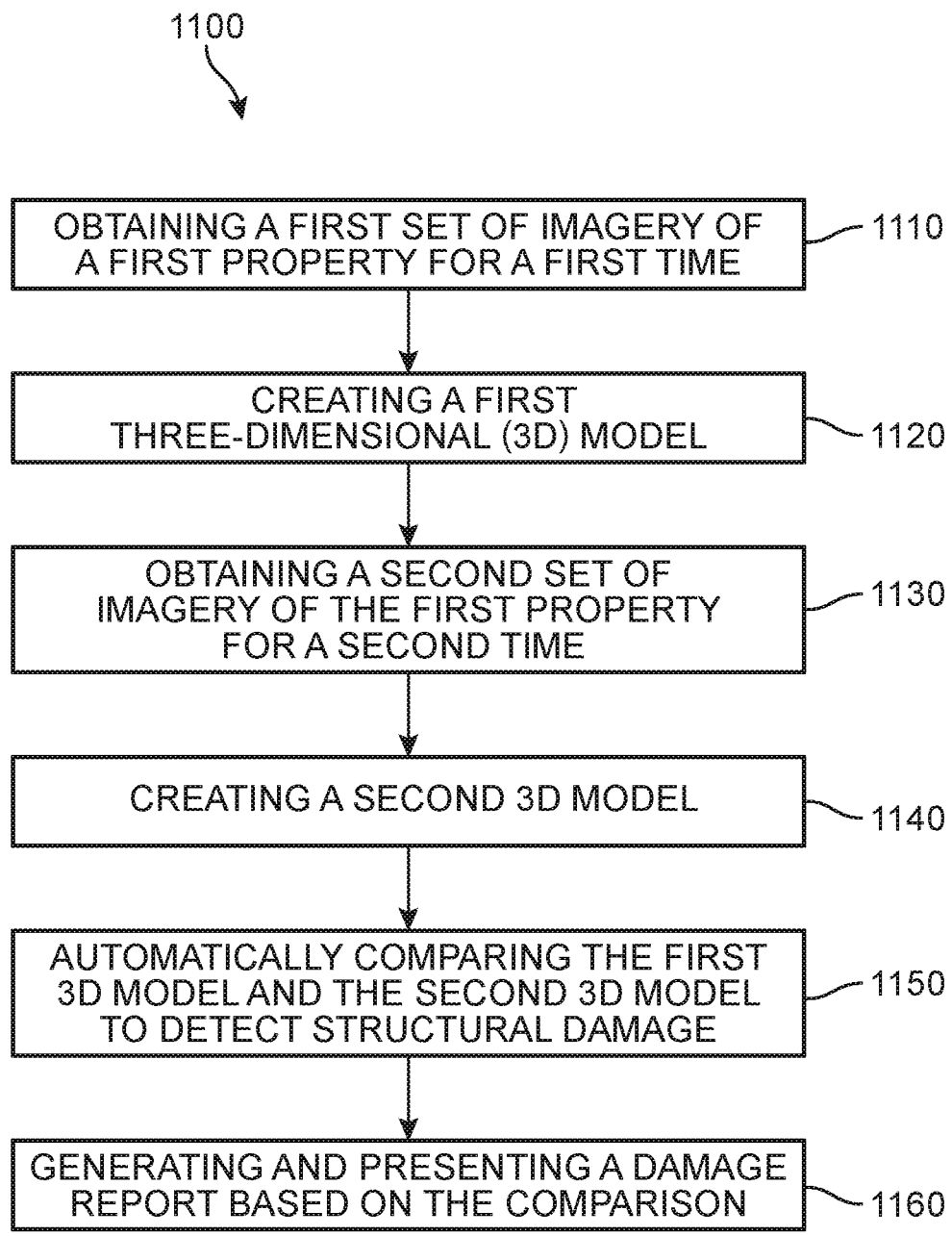
FIG. 11 a flow chart depicting a process of improving the accuracy of a damage assessment based on aerial imagery, according to an embodiment.

FIG. 11 is a flow chart illustrating an embodiment of a method 1100 of improving the accuracy of a damage assessment based on aerial imagery. A first step 1110 includes obtaining a first set of imagery of a first property captured at a first time, and a second step 1120 includes automatically creating a first three-dimensional (3D) model of the first property based on the first set of imagery. A third step 1130 includes obtaining a second set of imagery of the first property captured at a second time subsequent to the first time, and a fourth step 1140 includes automatically creating a second 3D model of the first property based on the second set of imagery. In addition, the method 1100 includes a fifth step 1150 of automatically comparing the first 3D model and the second 3D model using a machine learning model to detect damage on the first property that has occurred in the interval between the first time and the second time (e.g., where a natural disaster has occurred between those two time periods) and a sixth step 1160 of automatically generating and presenting a damage report based on the comparison of the first 3D model and the second 3D model.

In other embodiments, the method may include additional steps or aspects. In one embodiment, the first set of imagery and the second set of imagery each include both nadir aerial images and oblique aerial images for the first property. In another example in which the first property includes a first structure, the method also includes steps of automatically employing a deep learning damage classification model to determine that a first portion of the first structure has been damaged, automatically identifying varying damage magnitude levels associated with the first portion, and then automatically generating and presenting a first heat map that visually represents the damage magnitude levels associated with the first portion. In some other embodiments where the first property includes a yard, the method may also include steps of automatically employing a deep learning damage classification model to determine that a first area of the yard includes debris, automatically identifying varying damage magnitude levels associated with the first area, and automatically generating and presenting a first heat map that visually represents the damage magnitude levels associated with the first area.

In one example where the first property includes a first structure and each of the first set of imagery and the second set of imagery include oblique aerial images of the first structure, the method can also include automatically employing a machine learning model to evaluate the oblique aerial images and detect structural damage to sides of the first structure. As another example, wherein the damage includes structural damage to a first portion of a structure located on the first property, the method can include automatically determining overall dimensions of the first structure based on the first 3D model and the second 3D model, automatically calculating, based on the overall dimensions of the first structure, dimensions of the first portion, and automatically estimating repair costs for the first portion based on the calculated dimensions of the first portion. The estimate can be included in the report that is generated.

Other methods may be contemplated within the scope of the present disclosure. For example, in some embodiments, a method of improving the accuracy of a damage assessment based on aerial imagery includes a first step of obtaining a first set of imagery of a first property captured at a first time, and a second step of obtaining a second set of imagery of the first property captured at a second time subsequent to the first time, where a natural disaster has impacted the first property during the interval between the first time and the second time. In addition, the method includes a third step of feeding the first set of imagery and the second set of imagery to a deep learning damage classification model, and a fourth step of automatically determining, via the deep learning classification model, that a first portion of a first structure located on the first property has been damaged, and automatically identifying varying damage magnitude levels associated with the first portion. Furthermore, the method includes a fifth step of automatically generating and presenting a first heat map that visually represents the damage magnitude levels associated with the first portion.

In other embodiments, this method may include additional steps or aspects. In one embodiment, the method may also include steps of automatically creating a first three-dimensional (3D) model of the first structure based on the first set of imagery, automatically creating a second 3D model of the first structure based on the second set of imagery, automatically comparing the first 3D model and the second 3D model using a machine learning model to detect damage on the first structure that has occurred in the interval between the first time and the second time, and automatically generating and presenting a damage report based on the comparison of the first 3D model and the second 3D model. In one embodiment, the first set of imagery and the second set of imagery each include nadir aerial images for the first property.

In another example, the method can also include steps automatically employing the deep learning damage classification model to determine that a first area of a yard (located in the first property) includes debris, and identifying varying damage magnitude levels associated with the first area, and automatically generating and presenting a second heat map that visually represents the damage magnitude levels associated with the first area. In some cases where the first set of imagery and the second set of imagery each include oblique aerial images of the first structure, the method can also include automatically employing a machine learning model to evaluate the oblique aerial images and detect structural damage to sides of the first structure.

In addition, in some embodiments, the method further includes steps of automatically determining overall dimensions of the first structure based on the first 3D model and the second 3D model, automatically calculating, based on the overall dimensions of the first structure, dimensions of the first portion, and automatically estimating repair costs for the first portion based on the calculated dimensions of the first portion. The estimate can be included in the report that is generated. In another example, the method may also include steps of automatically obtaining a third set of imagery of the first property captured at a third time between the first time and the second time, and then automatically updating the first three-dimensional (3D) model of the first structure based on the third set of imagery.

As described herein, the proposed systems and methods offer significant advantages to damage assessment paradigms. Conventional approaches are limited to crude classifications such as "damaged, "partially damaged", or "not damaged" for the building as a whole, making estimations of rebuilding costs difficult and/or unreliable. In contrast, the proposed system is designed to automatically assign different degrees of damage across different portions of the building, allowing for more accurate estimates of the damage. For example, deep learning models are employed to identify condition concerns on the property, estimate rebuild costs, and other property attributes for each specific home with improved accuracy and specificity, unlike traditional probabilistic models that use features associated with such properties. These prediction accuracies have been observed to greater than 98%. Furthermore, while conventional approaches are limited to the detection of external damage based on nadir imagery, the proposed systems are configured to use information from both nadir and oblique views to infer damage to internal structures. In addition, while conventional approaches estimate repair costs using simple models that do not account for the specific dimensions of a building or structure, the proposed system constructs 3D models from aerial imagery that can be used to provide more accurate estimates of the spatial extent of the damage. Such 3D models can also be used to permit end-user to perform virtual inspections and damage reviews in lieu of ordering a costly physical inspection, facilitating large scale damage assessments for each member in the catastrophe zone. Furthermore, the proposed system is readily scalable, and the code base for data acquisition, processing, and UI presentation has been shown to provide robust, reliable results.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of improving the accuracy of a damage assessment based on aerial imagery, the method comprising:
    obtaining a first set of imagery of a first property captured at a first time;
    automatically creating a first three-dimensional (3D) model of the first property based on the first set of imagery, wherein the first set of imagery is clipped to generate first clipped images used to create the first 3D model, the clipping of the first set of imagery comprising:
    querying a geographic information source for a first footprint polygon,
    identifying first selected properties, from properties queried for in the first set of imagery, having a point in the first footprint polygon,
    re-geocoding the first selected properties, and
    clipping images in the first set of imagery at two zooms, based on the re-geocoding of the first selected properties;
    obtaining a second set of imagery of the first property captured at a second time subsequent to the first time;
    automatically creating a second 3D model of the first property based on the second set of imagery, wherein the second set of imagery is clipped to generate second clipped images used to create the second 3D model, the clipping of the second set of imagery comprising:
    querying the geographic information source for a second footprint polygon,
    identifying second selected properties, from properties queried for in the second set of imagery, having a point in the second footprint polygon,
    re-geocoding the second selected properties, and
    clipping images in the second set of imagery at two zooms, based on the re-geocoding of the second selected properties;
    automatically comparing the first 3D model and the second 3D model using a machine learning model to detect damage on the first property that has occurred in the interval between the first time and the second time; and
    generating and presenting a damage report based on the comparison of the first 3D model and the second 3D model.

2. The method of claim 1, wherein the two zooms for each set of imagery include a neighborhood level zoom and a structure level zoom.

3. The method of claim 1, wherein the first property includes a first structure, and the method further comprises:
    employing a deep learning damage classification model to determine that a first portion of the first structure has been damaged, and identifying varying damage magnitude levels associated with the first portion; and
    generating and presenting a first heat map that visually represents the damage magnitude levels associated with the first portion.

4. The method of claim 1, wherein the first property includes a yard, and the method further comprises:
    employing a deep learning damage classification model to determine that a first area of the yard includes debris, and identifying varying damage magnitude levels associated with the first area; and
    generating and presenting a first heat map that visually represents the damage magnitude levels associated with the first area.

5. The method of claim 1, wherein the first property includes a first structure and each of the first set of imagery and the second set of imagery include oblique aerial images of the first structure, and the method further comprises employing a machine learning model to evaluate the oblique aerial images and detect structural damage to sides of the first structure and to interior portions of the first structure.

6. The method of claim 1, wherein the damage includes structural damage to a first portion of a structure located on the first property, and the method further comprises:
- determining overall dimensions of the first structure based on the first 3D model and the second 3D model;
- calculating, based on the overall dimensions of the first structure, dimensions of the first portion; and
- estimating repair costs for the first portion based on the calculated dimensions of the first portion.

7. A method of improving the accuracy of a damage assessment based on aerial imagery, the method comprising:
- obtaining a first set of imagery of a first property captured at a first time;
- clipping the first set of imagery to generate first clipped images, the clipping of the first set of imagery comprising:
  - querying a geographic information source for a first coverage polygon,
  - selecting first selected properties, from properties queried for in the first set of imagery, having a point in the first coverage polygon,
  - re-geocoding the first selected properties, and
  - clipping images in the first set of imagery at two zooms, based on the re-geocoding of the first selected properties;
- obtaining a second set of imagery of the first property captured at a second time subsequent to the first time, wherein a natural disaster has impacted the first property during the interval between the first time and the second time;
- clipping the second set of imagery to generate second clipped images, the clipping of the second set of imagery comprising:
  - querying the geographic information source for a second coverage polygon,
  - selecting second selected properties, from properties queried for in the second set of imagery, having a point in the second coverage polygon,
  - re-geocoding the second selected properties, and
  - clipping images in the second set of imagery at two zooms, based on the re-geocoding of the selected properties;
- feeding the first clipped images and the second clipped images to a deep learning damage classification model;
- determining, via the deep learning classification model, that a first portion of a first structure located on the first property has been damaged, and identifying varying damage magnitude levels associated with the first portion; and
- generating and presenting a first heat map that visually represents the damage magnitude levels associated with the first portion.

8. The method of claim 7, further comprising:
- automatically creating a first three-dimensional (3D) model of the first structure based on the first clipped images;
- automatically creating a second 3D model of the first structure based on the second clipped images;
- automatically comparing the first 3D model and the second 3D model using a machine learning model to detect damage on the first structure that has occurred in the interval between the first time and the second time; and
- generating and presenting a damage report based on the comparison of the first 3D model and the second 3D model.

9. The method of claim 7, wherein the two zooms for each set of imagery include a neighborhood level zoom and a structure level zoom.

10. The method of claim 7, wherein the first property includes a yard, and the method further comprises:
- employing the deep learning damage classification model to determine that a first area of the yard includes debris, and identifying varying damage magnitude levels associated with the first area; and
- generating and presenting a second heat map that visually represents the damage magnitude levels associated with the first area.

11. The method of claim 7, wherein the first set of imagery and the second set of imagery each include oblique aerial images of the first structure, and the method further comprises employing a machine learning model to evaluate the oblique aerial images and detect structural damage to sides of the first structure and to interior portions of the first structure.

12. The method of claim 8, further comprising:
- determining overall dimensions of the first structure based on the first 3D model and the second 3D model;
- calculating, based on the overall dimensions of the first structure, dimensions of the first portion; and
- estimating repair costs for the first portion based on the calculated dimensions of the first portion.

13. The method of claim 8, further comprising:
- obtaining a third set of imagery of the first property captured at a third time between the first time and the second time; and
- automatically updating the first three-dimensional (3D) model of the first structure based on the third set of imagery.

14. A system for improving the accuracy of a damage assessment based on aerial imagery, the system comprising a processor and machine-readable media including instructions which, when executed by the processor, cause the processor to:
- obtain a first set of imagery of a first property captured at a first time;
- automatically create a first three-dimensional (3D) model of the first property based on the first set of imagery, wherein the first set of imagery is clipped to generate first clipped images used to create the first 3D model, the clipping of the first set of imagery comprising:
  - querying a geographic information source for a first footprint polygon,
  - identifying first selected properties, from properties queried for in the first set of imagery, having a point in the first footprint polygon,
  - re-geocoding the first selected properties, and
  - clipping images in the first set of imagery at two zooms, based on the re-geocoding of the first selected properties;
- obtain a second set of imagery of the first property captured at a second time subsequent to the first time;
- automatically create a second 3D model of the first property based on the second set of imagery, wherein the second set of imagery is clipped to generate second clipped images used to create the second 3D model, the clipping of the second set of imagery comprising:
  - querying the geographic information source for a second footprint polygon, identifying second selected properties, from properties queried for in the second set of imagery, having a point in the second footprint polygon, re-geocoding the second selected properties, and clipping images in the second set of imagery at two zooms, based on the re-geocoding of the second selected properties;

automatically compare the first 3D model and the second 3D model using a machine learning model to detect damage on the first property that has occurred in the interval between the first time and the second time; and generate and present a damage report based on the comparison of the first 3D model and the second 3D model, wherein the damage report comprises information related to a probability of information in the damage report being accurate.

15. The system of claim 14, wherein the two zooms for each set of imagery include a neighborhood level zoom and a structure level zoom.

16. The system of claim 14, wherein the instructions further cause the processor to:

employ a deep learning damage classification model to determine that a first portion of a first structure located on the first property has been damaged, and identifying varying damage magnitude levels associated with the first portion; and generate and present a first heat map that visually represents the damage magnitude levels associated with the first portion.

17. The system of claim 14, wherein the instructions further cause the processor to:

employ a deep learning damage classification model to determine that a first area of a yard located on the first property includes debris, and identify varying damage magnitude levels associated with the first area; and generate and present a first heat map that visually represents the damage magnitude levels associated with the first area.

18. The system of claim 14, wherein each of the first set of imagery and the second set of imagery include oblique aerial images of a first structure located on the first property, and wherein the instructions further cause the processor to employ a machine learning model to evaluate the oblique aerial images and detect structural damage to sides of the first structure and to interior portions of the first structure.

19. The system of claim 14, wherein the instructions further cause the processor to:

determine overall dimensions of a first structure located on the first property based on the first 3D model and the second 3D model;

calculate, based on the overall dimensions of the first structure, dimensions of the first portion; and estimate repair costs for the first portion based on the calculated dimensions of the first portion.

20. The system of claim 14, wherein the instructions further cause the processor to:

obtain a third set of imagery of the first property captured at a third time between the first time and the second time; and automatically update the first three-dimensional (3D) model of the first structure based on the third set of imagery.

* * * * *